United States Patent
Ohashi

(10) Patent No.: US 7,324,236 B2
(45) Date of Patent: Jan. 29, 2008

(54) DISCREPANCY CORRECTION METHOD AND APPARATUS FOR CORRECTING DIFFERENCE IN LEVELS OF IMAGE SIGNALS OBTAINED BY AN IMAGE SENSOR HAVING A MULTIPLE OUTPUT CHANNELS

(75) Inventor: Kazuhito Ohashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 09/772,664

(22) Filed: Jan. 30, 2001

(65) Prior Publication Data

US 2001/0030770 A1   Oct. 18, 2001

(30) Foreign Application Priority Data

Feb. 1, 2000 (JP) .............................. 2000-024389
Jun. 2, 2000 (JP) .............................. 2000-166394
Jan. 24, 2001 (JP) .............................. 2001-015744

(51) Int. Cl.
G06F 15/00 (2006.01)
H04N 1/40 (2006.01)

(52) U.S. Cl. .................... 358/1.18; 358/450; 358/453; 358/461

(58) Field of Classification Search ................. 358/1.9, 358/2.1, 1.18, 3.01, 3.21, 450, 453, 461, 358/504
See application file for complete search history.

(56) References Cited

U.S. PATENT DOCUMENTS

| | | | |
|---|---|---|---|
| 5,148,296 A | 9/1992 | Takashima | 358/482 |
| 5,284,746 A | 2/1994 | Sledziewski et al. | 435/6 |
| 5,366,889 A | 11/1994 | MacDonald et al. | 435/252.3 |
| 5,371,613 A * | 12/1994 | Arimoto et al. | 358/461 |
| 5,457,547 A * | 10/1995 | Yamada | 358/487 |
| 5,468,854 A | 11/1995 | McCabe et al. | 540/498 |
| 5,482,835 A | 1/1996 | King et al. | 435/6 |
| 5,491,084 A | 2/1996 | Chalfie et al. | 435/189 |
| 5,526,048 A * | 6/1996 | Yamamoto | 348/223.1 |
| 5,532,157 A | 7/1996 | Fink | 435/240.2 |
| 5,542,031 A * | 7/1996 | Douglass et al. | 358/1.15 |
| 5,576,436 A | 11/1996 | McCabe et al. | 546/156 |
| 5,581,636 A * | 12/1996 | Skinger | 382/276 |
| 5,644,409 A * | 7/1997 | Irie et al. | 358/461 |
| 5,912,992 A * | 6/1999 | Sawada et al. | 382/274 |
| 5,960,110 A * | 9/1999 | Usami | 382/167 |
| 5,989,835 A | 11/1999 | Dunlay et al. | 506/10 |
| 6,043,909 A * | 3/2000 | Holub | 358/504 |

(Continued)

FOREIGN PATENT DOCUMENTS

EP     0808057 A2    11/1997

(Continued)

Primary Examiner—David Moore
Assistant Examiner—James A. Thompson
(74) Attorney, Agent, or Firm—Morgan & Finnegan LLP

(57) ABSTRACT

Image signals output from a linear image sensor which outputs charges accumulated in pixels in the right-side area and charges accumulated in pixels in the left-side area via different channels are subjected to discrepancy correction. First, a gray reference board is scanned by the linear image sensor while changing charging periods, and look up tables for converting signal levels of the respective channels are generated on the basis of signal levels obtained by scanning the gray reference board. A discrepancy correction is realized by converting levels of image signals output from the two terminals using the look up tables.

16 Claims, 27 Drawing Sheets

U.S. PATENT DOCUMENTS

| | | | |
|---|---|---|---|
| 6,072,912 A * | 6/2000 | Orito | 382/274 |
| 6,204,910 B1 | 3/2001 | Iwai | |
| 6,600,577 B1 | 7/2003 | Umezawa | |
| 6,606,172 B1 | 8/2003 | Moro | |

FOREIGN PATENT DOCUMENTS

| | | |
|---|---|---|
| EP | 0878958 A2 | 11/1998 |
| EP | 0901277 A2 | 3/1999 |
| JP | 2-148972 | 6/1990 |
| JP | 3-44267 | 2/1991 |
| JP | 4-225681 | 8/1992 |
| JP | 5-191575 | 7/1993 |
| JP | 10-42111 | 2/1998 |
| JP | 10-224574 | 8/1998 |
| JP | 10-233921 | 9/1998 |
| JP | 11-27524 | 1/1999 |
| JP | 11-146155 | 5/1999 |
| JP | 11-215298 | 8/1999 |
| JP | 11-261760 | 9/1999 |
| JP | 11-275321 | 10/1999 |
| JP | 2000-78375 | 3/2000 |
| JP | 2000-78397 | 3/2000 |
| JP | 2000-151904 | 5/2000 |
| JP | 2000-188670 | 7/2000 |
| JP | 2000-188686 | 7/2000 |

* cited by examiner

MAIN SCANNING DIRECTION

MAIN SCANNING DIRECTION

MAIN SCANNING DIRECTION

F I G. 24
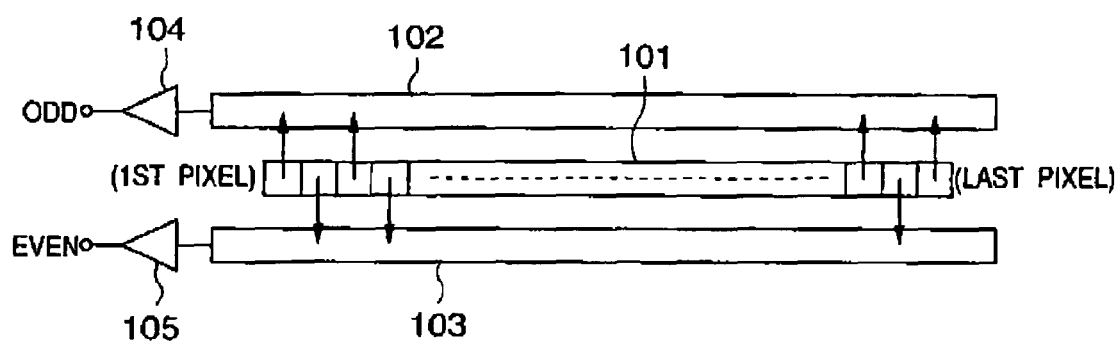
PRIOR ART

DISCREPANCY CORRECTION METHOD AND APPARATUS FOR CORRECTING DIFFERENCE IN LEVELS OF IMAGE SIGNALS OBTAINED BY AN IMAGE SENSOR HAVING A MULTIPLE OUTPUT CHANNELS

FIELD OF THE INVENTION

The present invention relates to an image sensing apparatus utilizing an image sensor having a multiple output channels and a discrepancy correction method for correcting differences in levels of read signals and, more specifically, to an image sensing apparatus, using an image sensor having a multiple output channels, having a discrepancy correction function of correcting differences in levels of signals output via the multiple output channels upon connecting the output signals and a discrepancy correction method for correcting signal level differences in the read signals.

BACKGROUND OF THE INVENTION

Conventionally, there is an image reading apparatus using a linear image sensor.

FIG. 24 shows a configuration of a linear CCD image sensor used in a conventional image reading apparatus.

Referring to FIG. 24, reference numeral 101 denotes a photoreceptive pixel array of the linear CCD image sensor; 102 and 103, analog shift registers for sequentially reading charges stored in the odd- and even-number pixels of the photoreceptive pixel array 101, respectively; and 104 and 105, output amplifiers for converting the charges read from the analog shift registers 102 and 103 into voltage signals and outputs the signals.

FIG. 25 shows an example of a configuration of an image reading apparatus which uses a linear image sensor of the aforesaid type (referred to as "E/O type linear sensor", hereinafter).

Referring to FIG. 25, reference numeral 208 denotes a linear image sensor (here, an E/O type linear sensor); 201, a platen glass; 202, an original; 203, an illumination lamp for illuminating the original; 204 to 206, first to third mirrors, respectively; 207, a lens for forming an image of the original on the photoreceptive surface of the E/O type linear sensor 208; 209, an image sensor operation circuit for operating the E/O type linear sensor 208; and 210, a white board to be read for obtaining reference data used in shading correction processing.

The illumination lamp 203 and the first to third mirrors 204 to 206 are at the position indicated by the solid lines when performing a normal reading operation of reading the original, whereas, they moves to the position indicated by the dot lines when reading the white board 210. Further, the first to third mirrors 204 to 206 move in the sub-scanning direction S when reading the original, thereby reading the original in two dimensions.

It should be noted that, in the E/O type linear sensor as shown in FIG. 24, the reason of separately reading charges accumulated in the even- and odd-number pixels of the photoreceptive pixel array 101 is that there is a limitation in transfer speed in the analog shift registers 102 and 103, and it is necessary to do so to achieve a scan speed faster than a predetermined speed.

Recently, a demand for an image reading apparatus which achieves an even faster scan speed than ever is increasing, and a scan speed which can not be achieved by an E/O type linear sensor as shown in FIG. 24 is demanded.

Under the above described circumstance, as a linear CCD image sensor capable of achieving a scan speed twice faster than that of the conventional E/O type linear sensor, the one which separately outputs charges, from a photoreceptive pixel array, accumulated in the even-number pixels in the right-side area, charges accumulated in the odd-number pixels in the right-side area, charges accumulated in the even-number pixels in the left-side area, and charges accumulated in odd-number pixels in the left-side area (referred to as "R/L type linear sensor" hereinafter) has been suggested.

In FIG. 26, reference numeral 301 denotes a photoreceptive pixel array of the linear CCD image sensor; 302 to 305, analog shift registers for sequentially reading the charges accumulated in the even- and odd-number pixels in the right- and left-side areas of the photoreceptive pixel array 301; and 306 to 309, output amplifiers for converting the charges read out from the analog shift registers 302, 304, 303 and 305, respectively, into voltage signals and outputting them.

The analog shift registers 302 to 305 of the R/L type linear sensor shown in FIG. 26 respectively read out charges accumulated in the odd-number pixels in the left-side area, charges accumulated in the odd-number pixels in the right-side area, charges accumulated in the even-number pixels in the left-side area, and charges accumulated in the even-number pixels in the right-side area of the photoreceptive pixel array 301.

FIG. 27 shows a timing chart of operation signals for the R/L type linear sensor shown in FIG. 26 and the output signals from the R/L type linear sensor.

Referring to FIG. 27, "SH" shows a charge shift pulse and controls gates for simultaneously transferring charges accumulated in the photoreceptive pixel array 301 to the analog shift registers 302 to 305. Therefore, as shown in FIG. 27, a period between one SH pulse and the next SH pulse is an accumulation period (Tint) for accumulating charges in the photoreceptive pixel array 301.

Further, $\Phi 1$ and $\Phi 2$ in FIG. 27 are charge transfer pulses for operating the analog shift registers 302 to 305, and sequentially transferring the charges, by pixel, which has been simultaneously transferred from the photoreceptive pixel array 301 to the analog shift registers 302 to 305 by the SH pulse toward the output amplifiers 306 to 309 arranged at the end of each of the analog shift registers 302 to 305. As a result, image signals indicated by ODD-1, EVEN-1, ODD-2, and EVEN-2 are outputted.

However, when the R/L type linear sensor as shown in FIG. 26 is used, even slight differences in linearity among the four channels cause differences in level in the output signals separately read for the right- and left-side areas, which results in a discrepancy in read signals at the dividing point between the right- and left-side areas.

In the E/O type linear sensor, differences in signal levels between even- and odd-number pixels are observed merely as a very small repeating pattern in the image. In contrast, in the R/L type linear sensor, even a small difference in signal level is quite noticeable because of the discrepancy at the dividing point between the right- and left-side areas.

SUMMARY OF THE INVENTION

The present invention has been made in consideration of the above situation, and has as its object to reduce signal level differences that are a defect of a R/L type sensor used for realizing a high-speed scan operation, and to match linearity between respective output channels.

According to the present invention, the foregoing object is attained by providing an image sensing apparatus comprising: an image sensor which separately outputs image signals of a plurality of divided areas of a plurality of photoreceptive pixels from a plurality of output terminals respectively corresponding to the plurality of divided areas; a control unit for controlling to read a reference density member having a predetermined density of half tone; and an adjustment unit for adjusting levels of the image signals output by the output terminals so as to substantially correspond to a level of a predetermined reference signal based on data obtained by reading the reference density member by the image sensor.

Further, the foregoing object is also attained by providing an image sensing method in image sensing apparatus having an image sensor which separately outputs image signals of a plurality of divided areas of a plurality of photoreceptive pixels from a plurality of output terminals respectively corresponding to the plurality of divided areas, and a processing unit for processing the output image signals, the method comprising: a reading step of reading a reference density member having a predetermined density of half tone by the image sensor; an adjustment step of adjusting the processing unit so as to substantially correspond levels of the image signals output from the output terminals to a level of a predetermined reference signal based on data obtained by reading the reference density member by the image sensor; and an original read step of reading an original by the image sensor.

Furthermore, the foregoing object is also attained by providing an image sensing apparatus comprising: an image sensor which separately outputs image signals of a plurality of divided areas of a plurality of photoreceptive pixels from a plurality of output terminals respectively corresponding to the plurality of divided areas; a plurality of signal processing units, respectively corresponding to the plurality of divided areas, for applying predetermined signal processing to the image signals output from the output terminals; a white board; a control unit for controlling to read a reference density member having a predetermined density of half tone; and an adjustment data acquisition unit for acquiring adjustment data, for the respective signal processing units, for 1) substantially matching levels of the image signals output from the plurality of signal processing units to a first predetermined level when the white board is scanned, 2) substantially matching levels of the image signals output from the plurality of signal processing units to a second predetermined level when the reference density board is scanned, and 3) substantially matching levels of the image signals output from the plurality of signal processing units to a level obtained by interpolating between the first and second predetermined levels when an image having a density other than the density of the white board and the reference density board is scanned; and an adjustment unit for adjusting levels of image signals output from the plurality of signal processing units using the adjustment data.

Further, the foregoing object is also attained by providing an adjustment method of adjusting image signals in an image sensing apparatus having an image sensor which separately outputs image signals of a plurality of divided areas of a plurality of photoreceptive pixels from a plurality of output terminals respectively corresponding to the plurality of divided areas, a plurality of signal processing units, respectively corresponding to the plurality of divided areas, for applying predetermined signal processing to the image signals output from the output terminals, and a white board, the method comprising: a first reading step of scanning the white board by the image sensor and outputting image signals processed by the plurality of signal processing units; a second reading step of scanning the reference density board by the image sensor and outputting image signals processed by the plurality of signal processing units; an adjustment data acquisition step of acquiring adjustment data, for the respective signal processing units, for 1) substantially matching levels of the image signals output in the first reading step to a first predetermined level, 2) substantially matching levels of the image signals output in the second reading step to a second predetermined level, and 3) substantially matching levels of the image signals output from the plurality of signal processing units to a level obtained by interpolating between the first and second predetermined levels when an image having a density other than the density of the white board and the reference density board is scanned on the basis of the image signals obtained in the first and second reading steps; and an adjustment step of adjusting levels of image signals output from the plurality of signal processing units using the adjustment data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 24 shows a configuration of a conventional linear CCD image sensor;

DETAILED DESCRIPTION OF THE PREFERRED EMBODIMENTS

Preferred embodiments of the present invention will be described in detail below in accordance with the accompanying drawings.

First Embodiment

Figure 1:
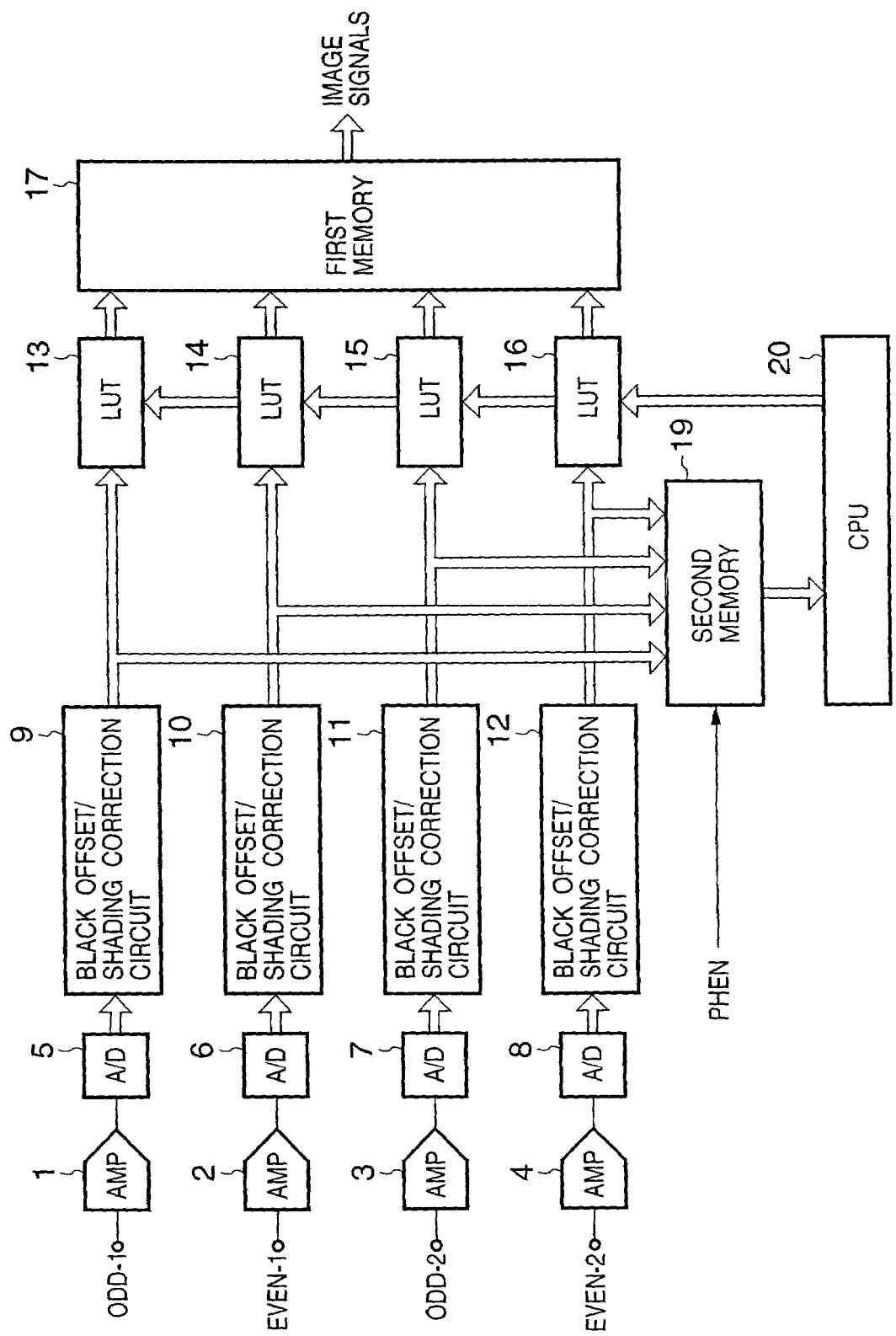
FIG. 1 is a block diagram illustrating a partial configuration of an image reading apparatus according to a first embodiment of the present invention.
Figure 2:
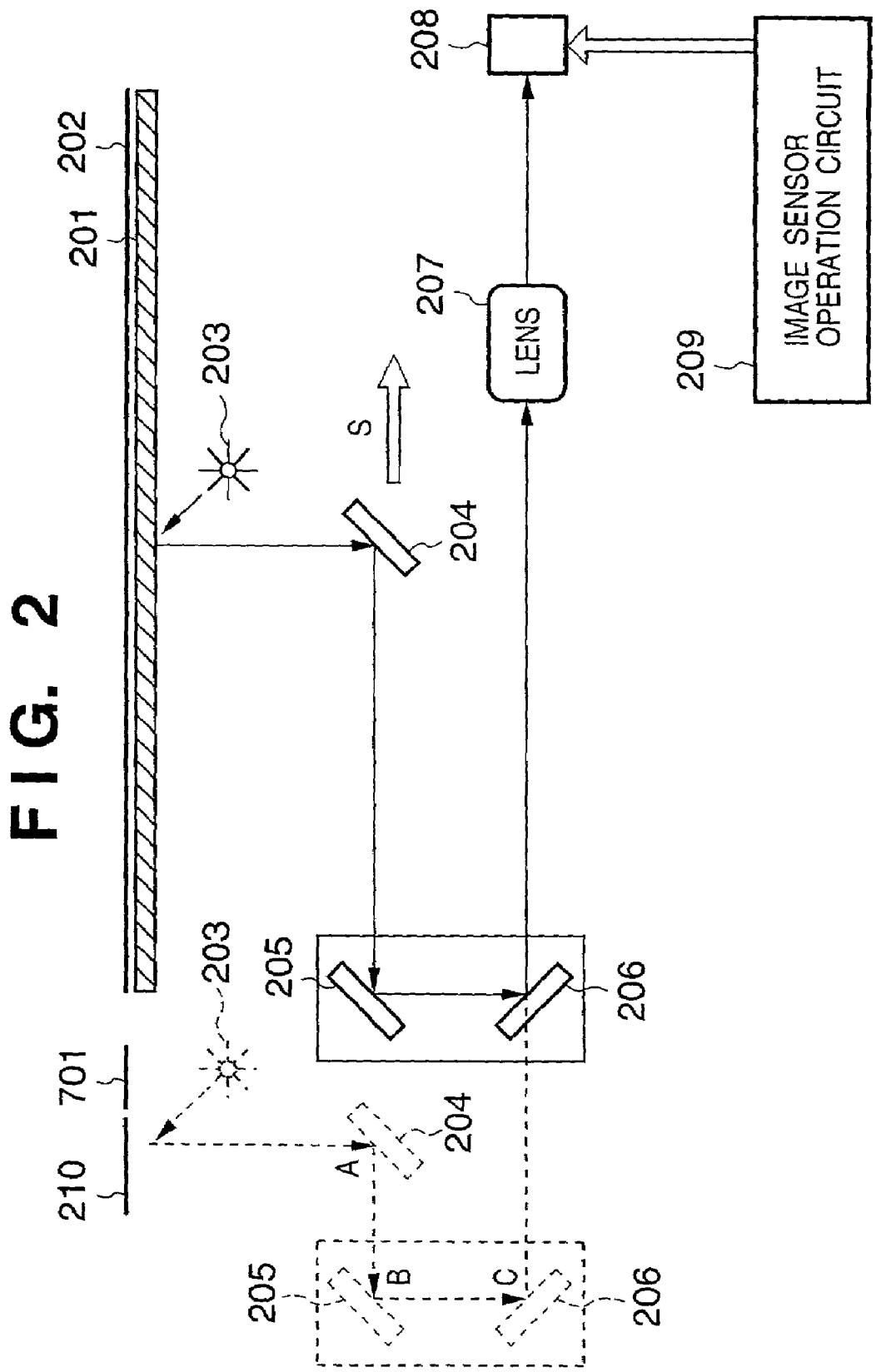
FIG. 2 is a block diagram schematically illustrating a configuration of the image reading apparatus according to the first embodiment of the present invention.
Figure 3:
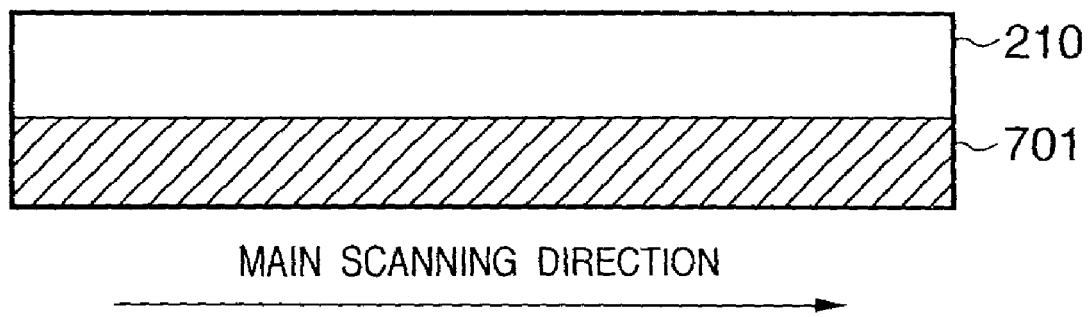
FIG. 3 shows white and gray reference boards according to the first embodiment of the present invention.

FIGS. 1 to 3 shows a configuration of an image reading apparatus according to the first embodiment of the present invention.

Figure 26:
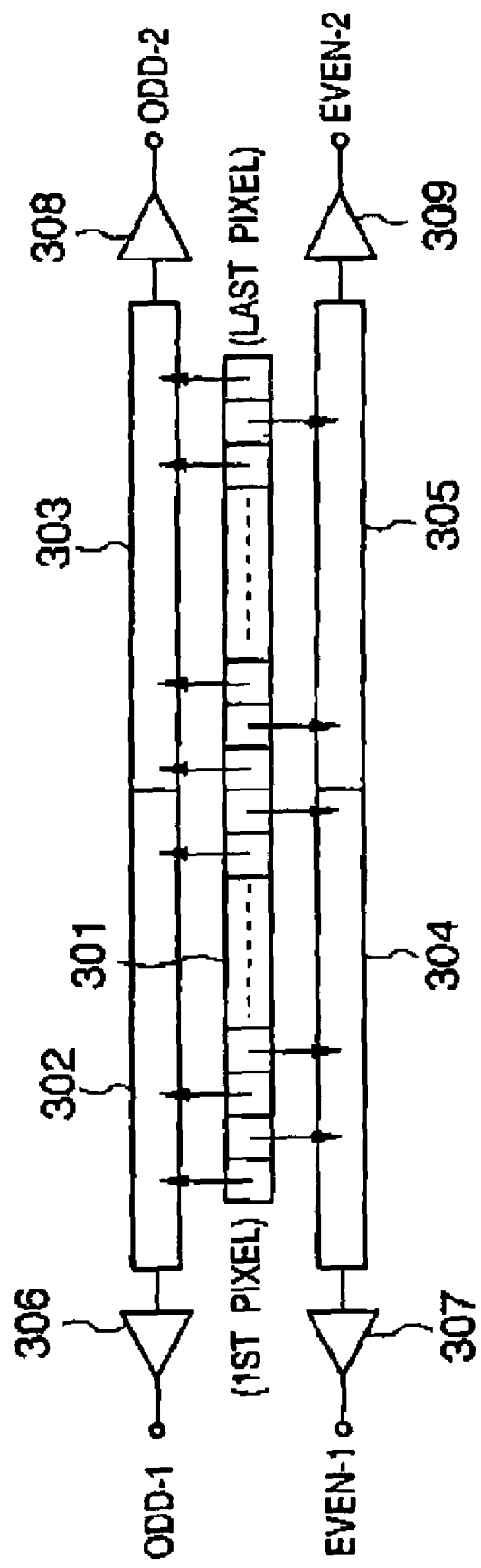
FIG. 26 shows another configuration of a conventional linear CCD image sensor.

In FIG. 1, reference numeral 1 to 4 denote amplifiers for amplifying output signals from an R/L type linear sensor as shown in FIG. 26; 5 to 8, A/D converters for converting output signals amplified by the amplifiers 1 to 4 to digital signals; 9 to 12, black offset/shading correction circuits for performing black offset correction by subtracting black offset level from the digital signals and performing shading correction.

LUTs 13 to 16 as discrepancy correction means are for realizing discrepancy correction (correcting level differences in signals) of the right and left signals by adjusting signal levels of ODD-1, EVEN-1, ODD-2 and EVEN-2.

Figure 27:
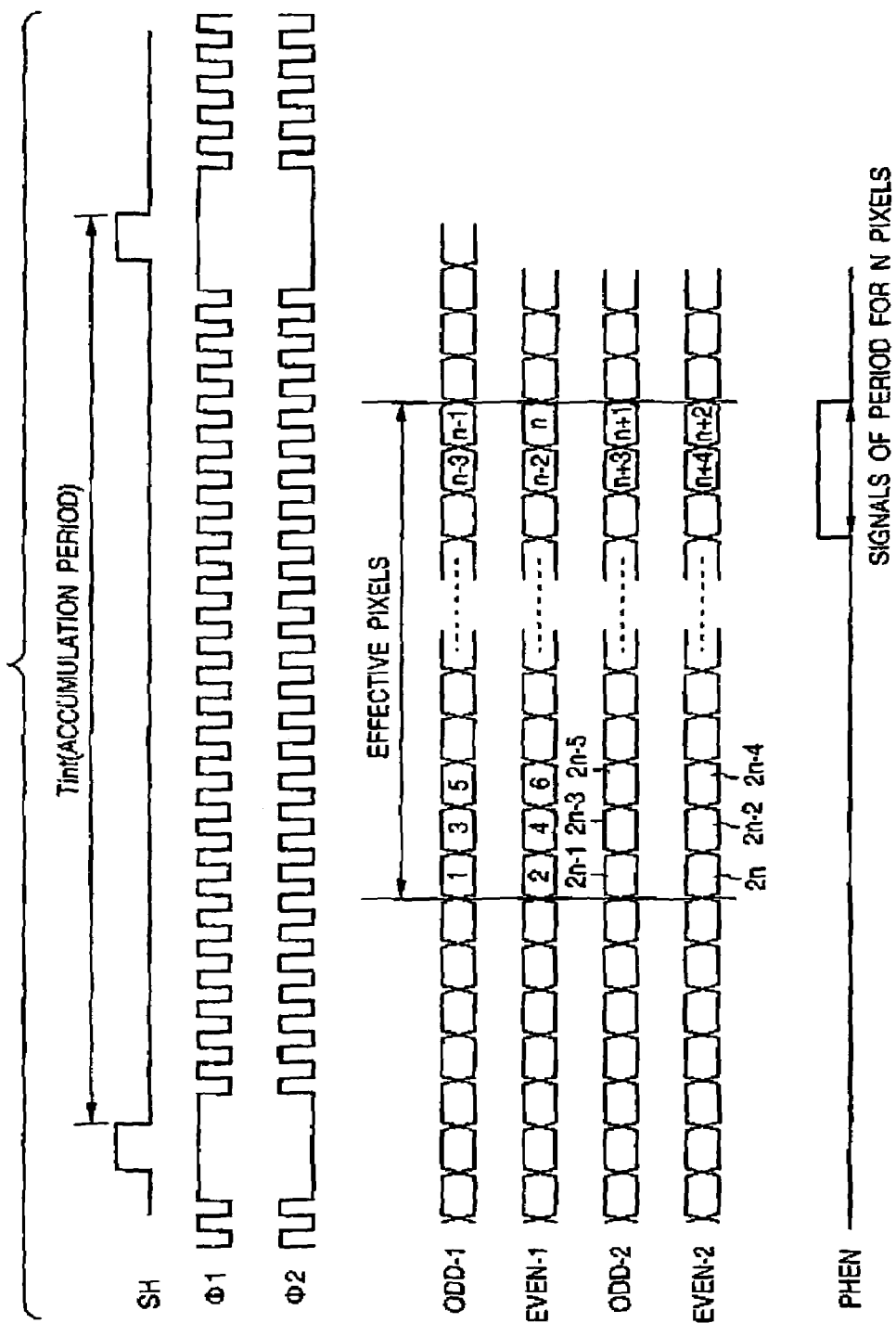
FIG. 27 is a timing chart of operation signals for a linear CCD image sensor shown in FIG. 26 and signals output from the linear CCD image sensor.

A first memory 17 is used for temporarily storing signals output from the R/L type linear sensor at timing shown in FIG. 27, and rearranging the order of the signals to the order of pixels, and outputting the rearranged signals, and a second memory 19 temporarily stores pixel data so that a CPU 30 can fetch pixel data during the "High" period of a signal PHEN shown in FIG. 27. The contents to be set in the LUTs 13 to 16 for discrepancy correction are determined from obtained image data by performing operations (will be described later).

FIG. 2 shows a schematic configuration of the image reading apparatus of the present invention.

Figure 25:
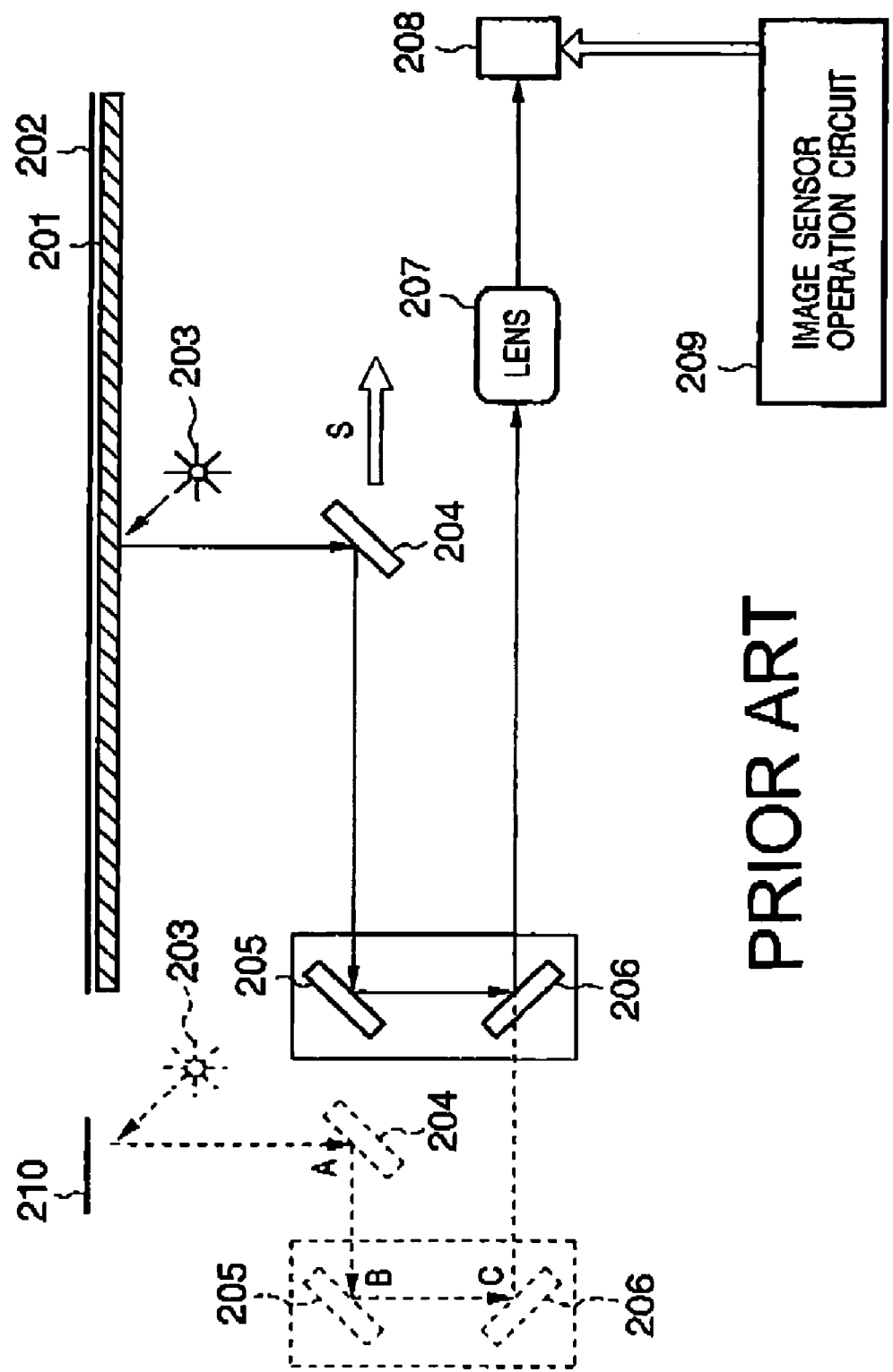
FIG. 25 shows an example of configuration of a conventional image reading apparatus.

The image reading apparatus shown in FIG. 2 differs from the conventional image reading apparatus shown in FIG. 25 in that it has a gray reference board 701 and a R/L type linear sensor is used instead of an E/O type linear sensor.

In FIG. 2, reference numeral 208 denotes a linear image sensor (here, a R/L type linear sensor as described above); 201, a platen glass; 202, an original; 203, an illumination lamp for illuminating the original; 204 to 206, first to third mirrors, respectively; 207, a lens for forming an image of the original on the photoreceptive surface of the R/L type linear sensor 208; 209, an image sensor operation circuit for operating the R/L type linear sensor 208; and 210 a white board to be read for obtaining reference data used in shading correction processing.

The illumination lamp 203 and the first to third mirrors 204 to 206 are at the position indicated by the solid lines when performing a normal reading operation of reading the original and moves to the position indicated by the dot lines when reading the gray reference board 701 and the white board 210. Further, the first to third mirrors move in the sub-scanning direction S when reading the original, thereby reading the original in two dimensions.

The gray reference board 701 is a board colored in gray (a non-chromatic color between white and black). In FIG. 2, the gray reference board 701 and white board 210 for shading correction are arranged side by side, however, they may be configured on a single board as shown in FIG. 3.

Next, a discrepancy correction method according to the first embodiment of the present invention will be explained in detail.

Figure 4A:
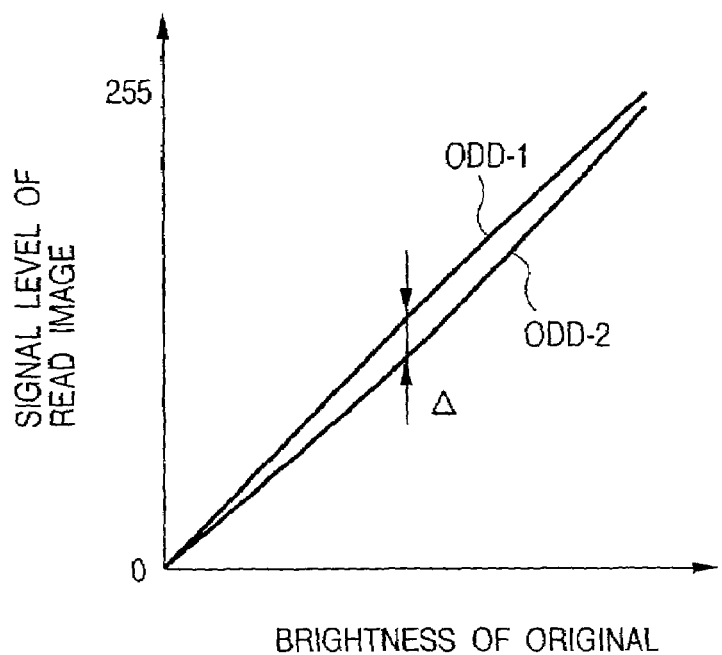
FIGS. 4A and 4B are graphs for explaining a discrepancy correction method according to the first embodiment of the present invention.

FIG. 4A is a graph showing an example of ODD-1 signal and ODD-2 signal before the discrepancy correction (LUT conversion) is applied. In the graph of FIG. 4A, the abscissa represents brightness of an original, and the ordinate represents signal levels of read image signals. Since ODD-1 and ODD-2 signals are outputted via different output amplifiers 306 and 308 of the R/L type linear sensor and further amplified by different amplifiers 1 and 3, then converted to digital signals by different A/D converters 5 and 7, respectively, signals obtained by reading the original of the same brightness have slightly different signal levels. Note, FIG. 4A only shows ODD-1 and ODD-2 signals, and other two signals EVEN-1 and EVEN-2 respectively have slightly different linearity from the linearity of ODD-1 and ODD-2 signals.

Figure 4B:
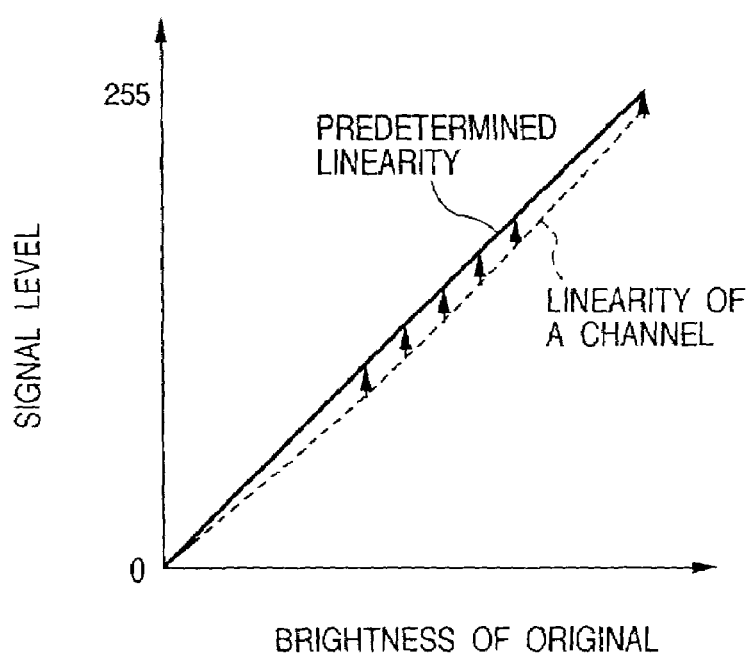

The LUTs 13 to 16 as the discrepancy correction means are to match signal levels of the four channels for brightness by correcting levels of signals output from the four channels to a predetermined linearity as shown in FIG. 4B. It is possible to match signal levels of the ODD-1 and ODD-2 signals in this manner, and the rest of the signals, namely, EVEN-1 and EVEN-2 signals can be corrected in the same manner, thereby matching signal levels of all the channels.

For realizing the discrepancy correction (correction of read signal level) based on the aforesaid method, the processes performed in the present invention will be explained with reference to FIG. 21.

First, a predetermined accumulation period is set in step S101, then an image is read using the gray reference board

701 shown in FIG. 2 in step S102. Upon reading the gray reference board 701, the accumulation period in the R/L type linear sensor 208 is changed (step S104) and the gray reference board 701 is read each time after the accumulation period is changed until step S103 becomes "Yes" (i.e., a predetermined number of times), thereby obtaining signal levels corresponding to the different accumulation periods.

Figure 5:
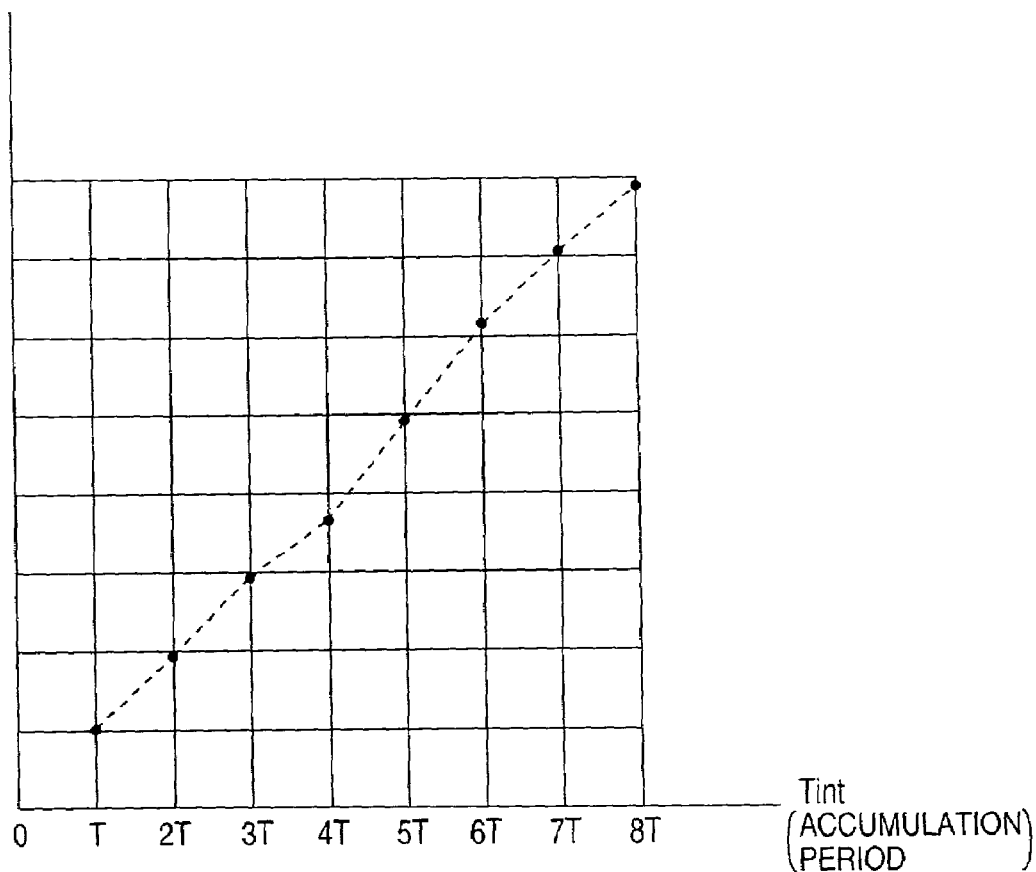
FIG. 5 is a graph showing an example of data obtained by reading the gray reference board of the present invention.
Figure 6:
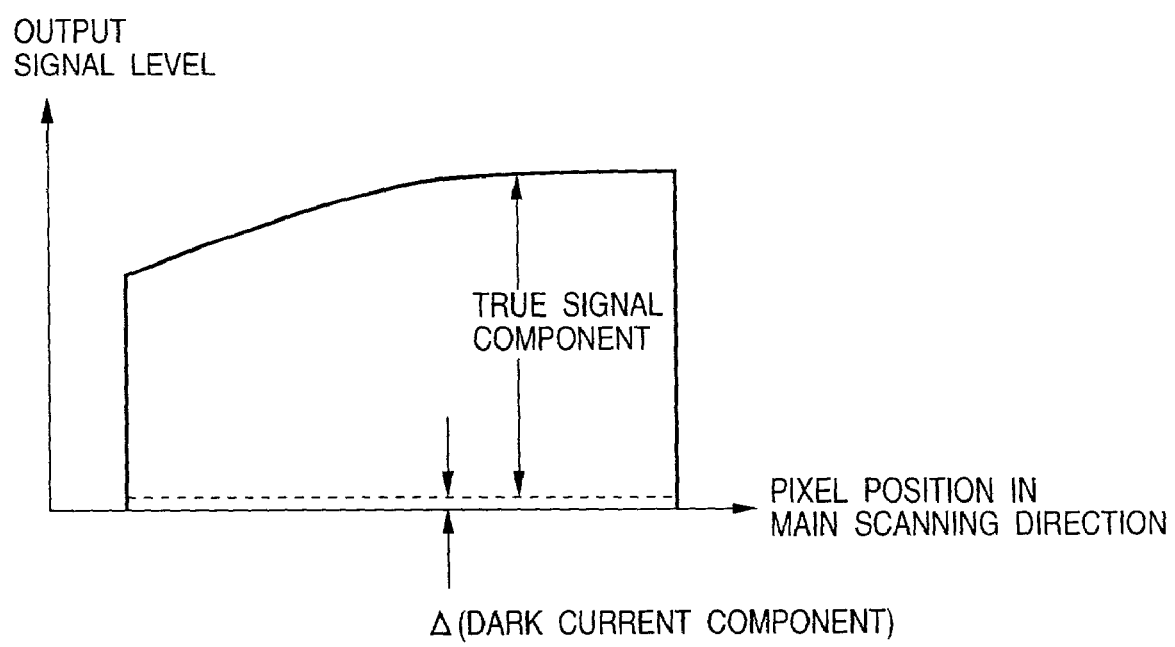
FIG. 6 is a graph showing an effect of dark current on an output signal.

FIG. 5 shows an example of data obtained from one channel by scanning the gray reference board 701.

In the graph of FIG. 5, the abscissa represents accumulation period (Tint) and the ordinate represents signal levels obtained by scanning the gray reference board 701. In FIG. 5, data for each of accumulation periods which are integer multiples of a predetermined period T are shown, however, any accumulation periods may be used.

Image data obtained by reading the gray reference board 701 for different accumulation periods are stored in the second memory 19, and CPU 20 read the image data stored in the second memory 19, averages the image data for the respective channels, thereby obtaining signal levels of the respective channels. The graph shown in FIG. 5 is obtained by repeating the aforesaid processing for different accumulation periods nT (n is an integer). Therefore, the graph of FIG. 5 shows the linearity characteristics of one of the channels (step S105).

Note, when the accumulation period nT is changed, an effect of dark current generated in the photoreceptive portion changes in dependence upon the length of the accumulation period. Dark current is charge component generated in the photoreceptive portion even when no light incidents, and accumulated charge due to the dark current increases as the accumulation period increases. Therefore, signal levels obtained by scanning the gray reference board 701 should be subtracted by a black level obtained under the condition in which no light incidents on the photoreceptive portion, and the should be used as the true signal levels of the gray reference board 701.

Figure 7:
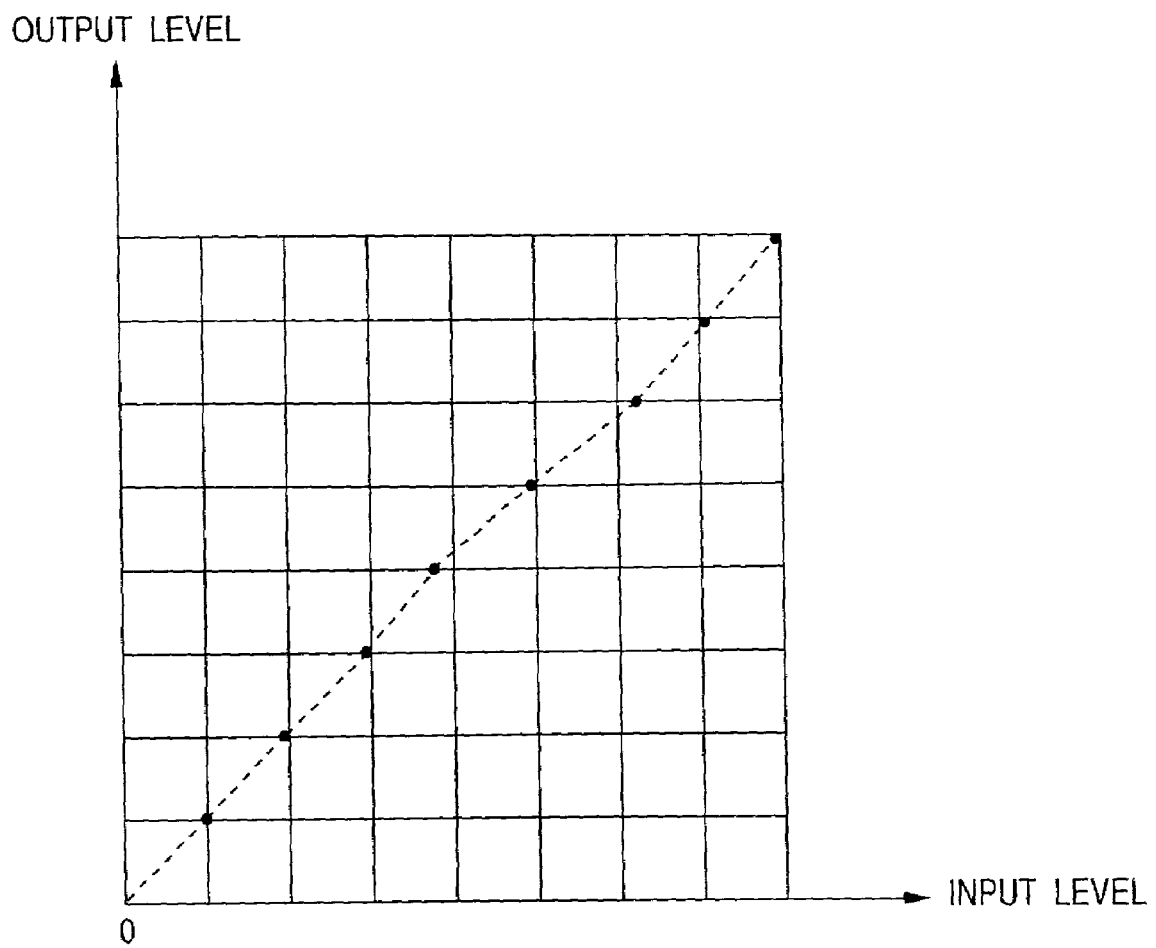
FIG. 7 is a graph showing conversion characteristics of LUT for converting linearity characteristics shown in FIG. 5 to ideal linearity characteristics.

Next, data for correcting the linearity characteristics shown in FIG. 5 is calculated in step S106. Gaps between signal levels of the respective channels are corrected using the calculated correction data (discrepancy correction data) FIG. 7 shows a graph showing conversion characteristics of a LUT used for correcting the linearity characteristics shown in FIG. 5 to an ideal linearity. The conversion characteristics may be obtained by inverting the characteristics shown in FIG. 5.

Figure 8:
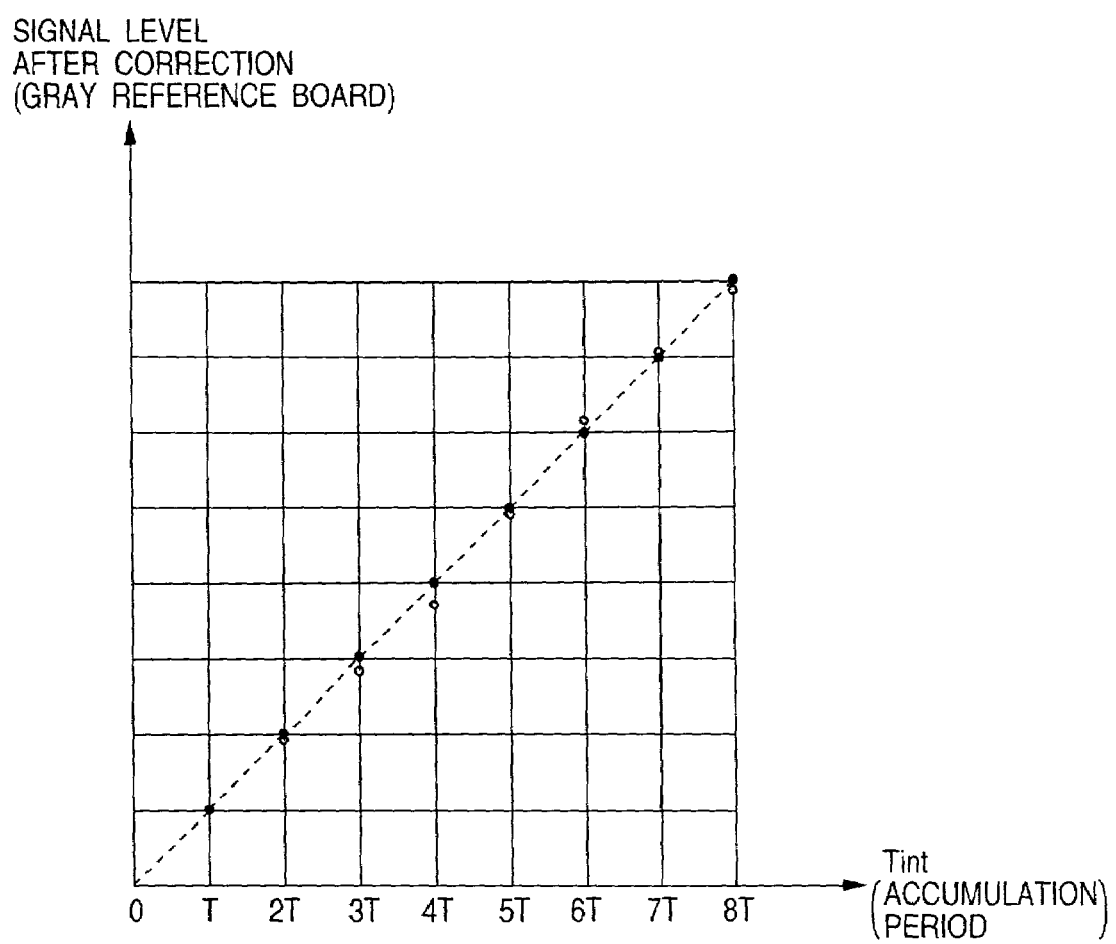
FIG. 8 is a graph showing ideal linearity characteristics after correction.

With the correction as described above, the linearity of one channel as shown in FIG. 5 is corrected to an ideal linearity as shown in FIG. 8.

It should be noted that in the aforesaid explanation the linearity of each channel of the R/L type linear sensor is changed to an ideal linearity, however, the present invention is not limited to this, and the linearity to which the linearity of each channel is changed may be any predetermined linearity since discrepancy correction of image signals output from the R/L type linear image sensor is the purpose of the correction in the first embodiment.

CPU 20 sets the discrepancy correction data obtained as described above to the LUTs 13 and 15 in FIG. 1 (step S107), thus levels of read ODD-1 and ODD-2 signals are corrected. Gap correction data for the EVEN-1 and EVEN-2 signals may be calculated in the same manner, and by setting the obtained discrepancy correction data to the LUTs 14 and 16, levels of read EVEN-1 and EVEN-2 signals can be also corrected.

According to the first embodiment as described above, it is possible to reduce a discrepancy between signals, which is a defect of an R/L type linear sensor used to realize high-speed scan operation.

Note, the LUTs as discrepancy connection circuits are arranged downstream to the shading correction circuits according to the first embodiment. This is because the discrepancy correction means realize not only discrepancy correction but also linearity correction, and by arranging the discrepancy correction means downstream to the shading correction circuits, it is possible to achieve stable linearity independent of main scanning position(???).

Second Embodiment

Next, the second embodiment will be explained.

In the first embodiment, the discrepancy correction means are arranged downstream to the shading correction circuits. In other words, signals output from the respective channels are applied with shading correction first, then discrepancy correction next, so that linearity of the signals from the respective channels match. Therefore, when the quantity of light emitted by the illumination lamp changes and gains used in shading correction change, there is a possibility that correction data used in the linearity correction may become inappropriate.

Figure 9:
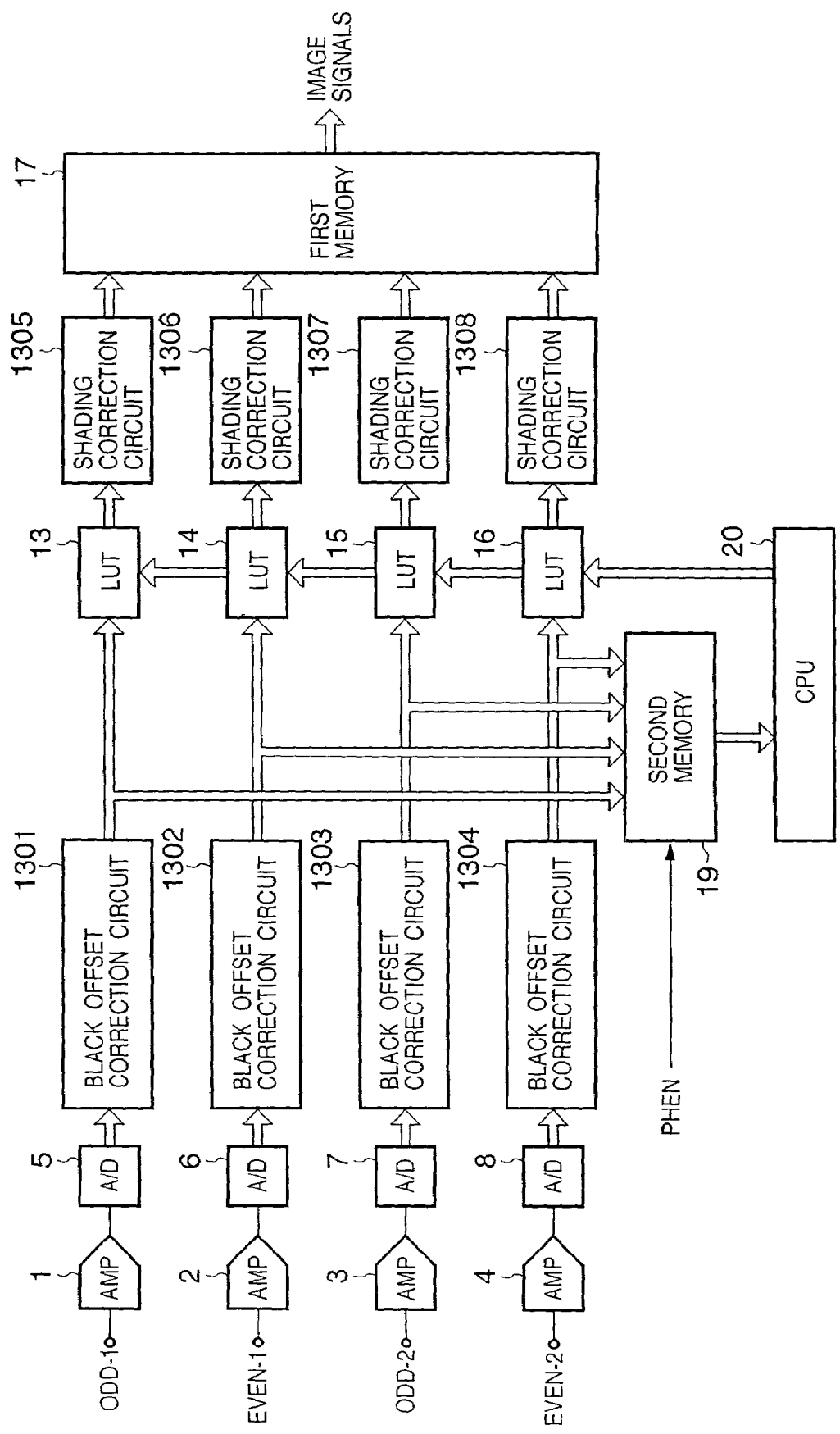
FIG. 9 is a block diagram illustrating a partial configuration of an image reading apparatus according to a second embodiment of the present invention.

In order to solve this problem, an image reading apparatus according to the second embodiment of the present invention has a configuration as shown in FIG. 9.

The configuration shown in FIG. 9 differs from that shown FIG. 1 explained in the first embodiment in that the LUTs 13 to 16 as discrepancy correction means for performing discrepancy correction are arranged upstream to shading correction circuits 1305 to 1308.

Black offset correction circuits 1301 to 1304 (circuits for eliminating the black offset component from read signals by subtraction) process read signals before the discrepancy correction is performed by the LUTs 13 to 16. However, whether the black offset correction is performed before or after the discrepancy correction by the LUTs 13 to 16 does not limit the present invention, and either is possible.

The processing of the discrepancy correction is the same as that of the first embodiment, and therefore, the explanation of it is omitted.

According to the second embodiment, by arranging the discrepancy correction means upstream to the shading correction circuits, linearity of signals output from the respective channels are corrected before the shading correction is performed. Accordingly, when the quantity of light emitted by the illumination lamp of the image reading apparatus has changed, stable discrepancy correction is achieved.

Note, each of the arrangements explained in the first and second embodiments has both advantages and disadvantages; therefore, these arrangements may be selected depending upon utilization conditions.

Further, it is not difficult to configure the image reading apparatus so that the CPU changes the order of the discrepancy correction means and the shading correction circuits.

It should be noted that the discrepancy correction is performed using LUTs in the first and second embodiments, however, the present invention is not limited to this, and the discrepancy correction may be realized by generating operation equations for converting linearity and converting the linearity of read signals from the respective channels by using these operation equations.

Third Embodiment

The third embodiment of the present invention will now be explained.

The configuration of an image reading apparatus according to the third embodiment is the same as that explained in the first embodiment with reference to FIGS. 1 to 3, therefore, the explanation of it is omitted here.

Next, a method of correcting linearity of the respective channels according to the third embodiment will be explained in detail.

Figure 10A:
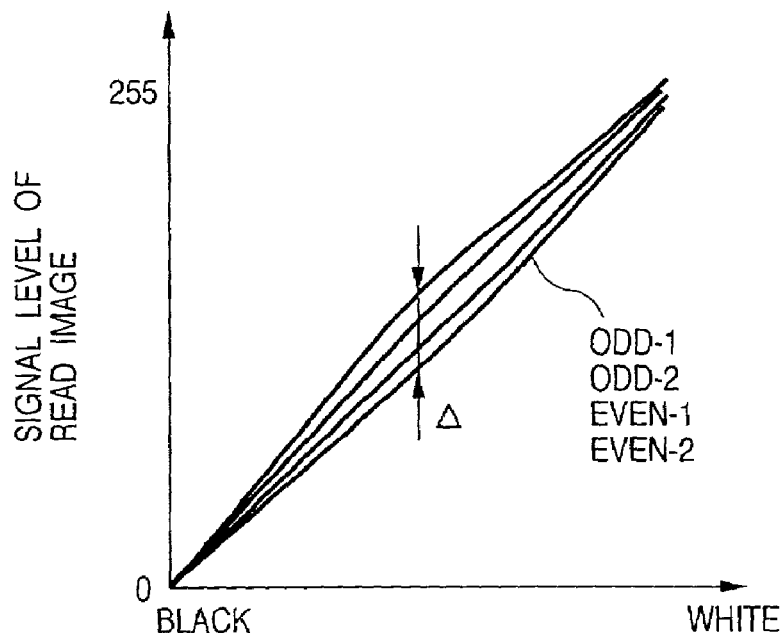
FIGS. 10A and 10B are graphs for explaining a discrepancy correction method according to a third embodiment of the present invention.

FIG. 10A shows relationship between signal levels of the respective channels before performing the linearity correction (e.g., LUT conversion). In the graph of FIG. 10A, the abscissa represents brightness of an original, and the ordinate represents signal levels of read image. The black level of each channel is corrected in black level correction, and the white level is corrected in shading correction by the black offset/shading correction circuits 9 to 12. Accordingly, there are not much difference in black and white signal levels between the respective channels. However, signal levels corresponding to the intermediate brightness vary among the channels. This is because the amplifiers and A/D converters which process output signals of the respective channels are different from each other, and slight difference in linearity characteristics can not be avoid.

Figure 10B:
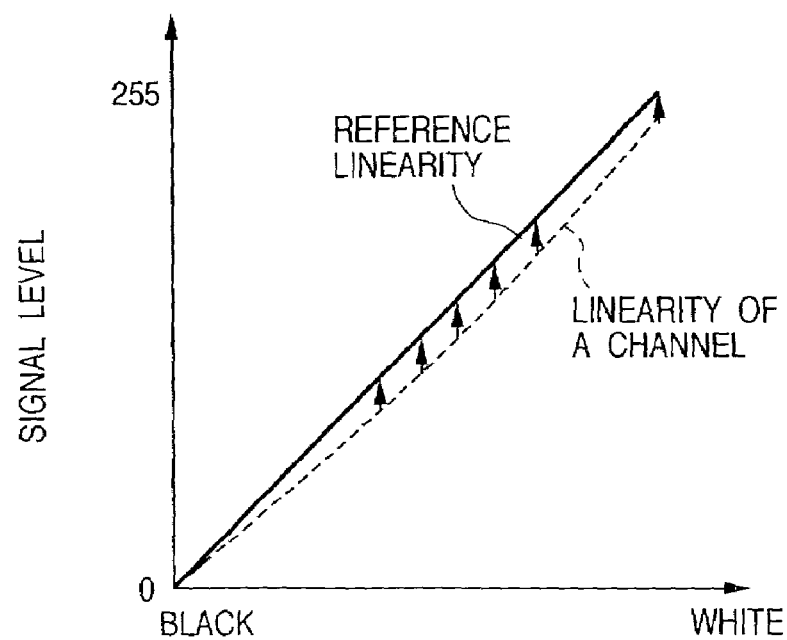

The LUT 13 to 16 change signal levels of the respective channels corresponding to the same brightness to a predetermined linearity, as shown in FIG. 10B, thereby matching the linearity of the respective channels.

Figure 22:
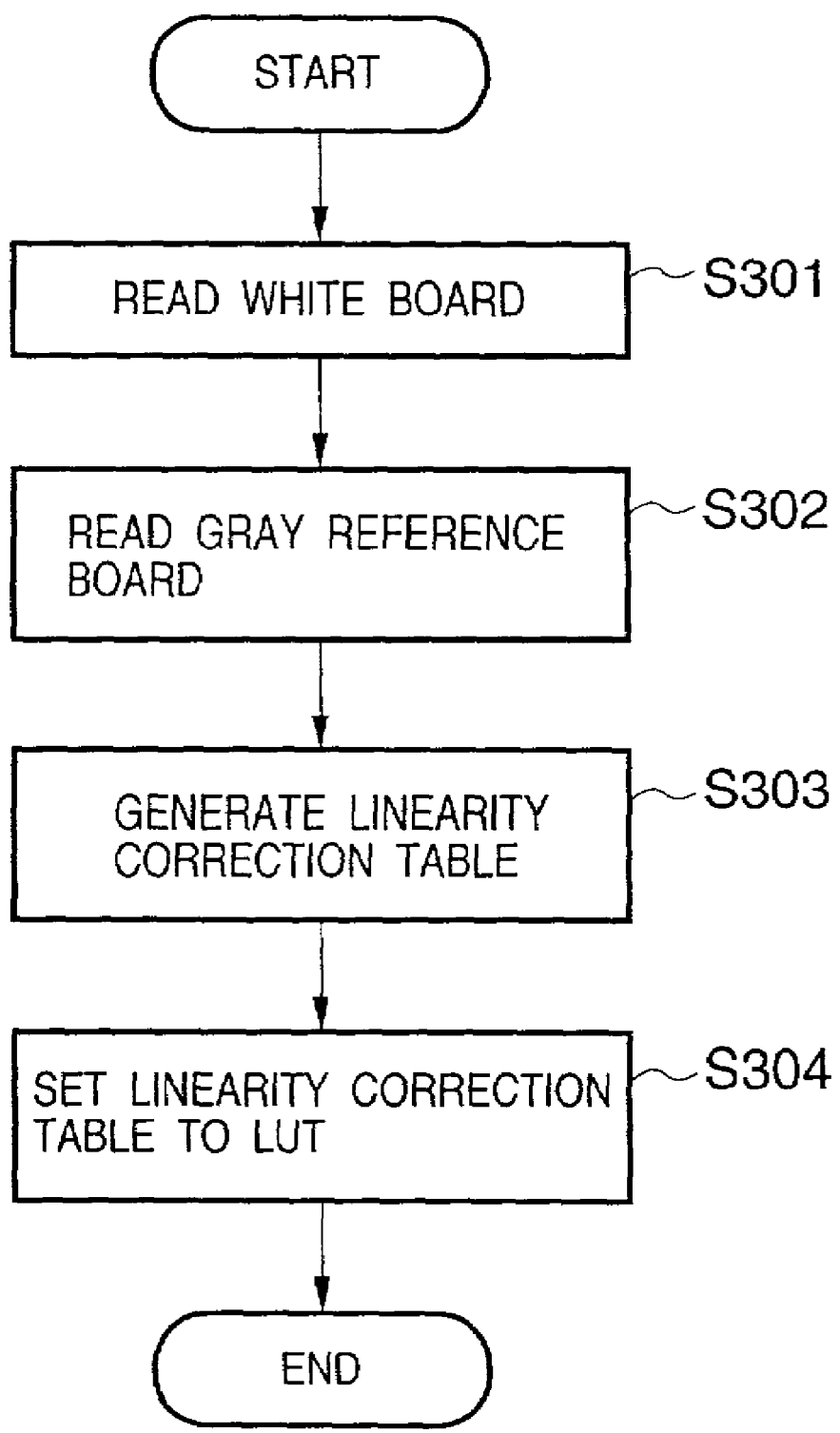
FIG. 22 is a flowchart showing a processing sequence of a linearity correction method according to the third embodiment.

In order to realize the aforesaid linearity correction, the averages of signal level of pixels in the vicinity of the connection portion for the respective channels are calculated for the white board 210 and the gray reference board 701 shown in FIG. 2, as shown in a flowchart of FIG. 22. To calculate the average, the white board 210 and the gray reference board 701 are read first as described above (steps S301 and S302), and the read image data are temporally stored in the second memory 19. Thereafter, the CPU 20 reads the image data from the second memory 19 and averages the image data of the pixels in the vicinity of the connection portion for each channel.

Figure 11A:
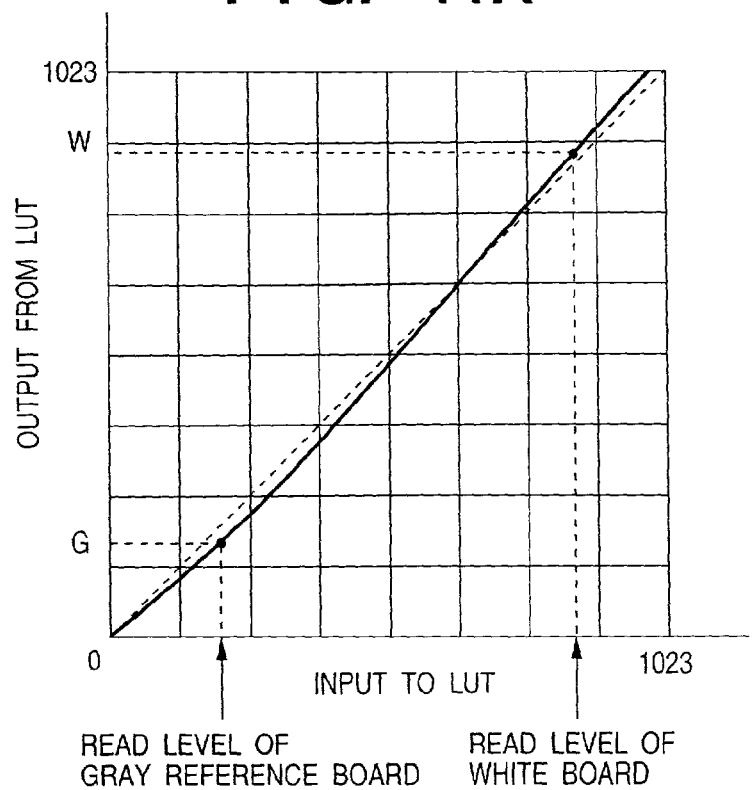
FIGS. 11A and 11B are graphs showing examples of contents set in LUT according to the third embodiment of the present invention.
Figure 11B:
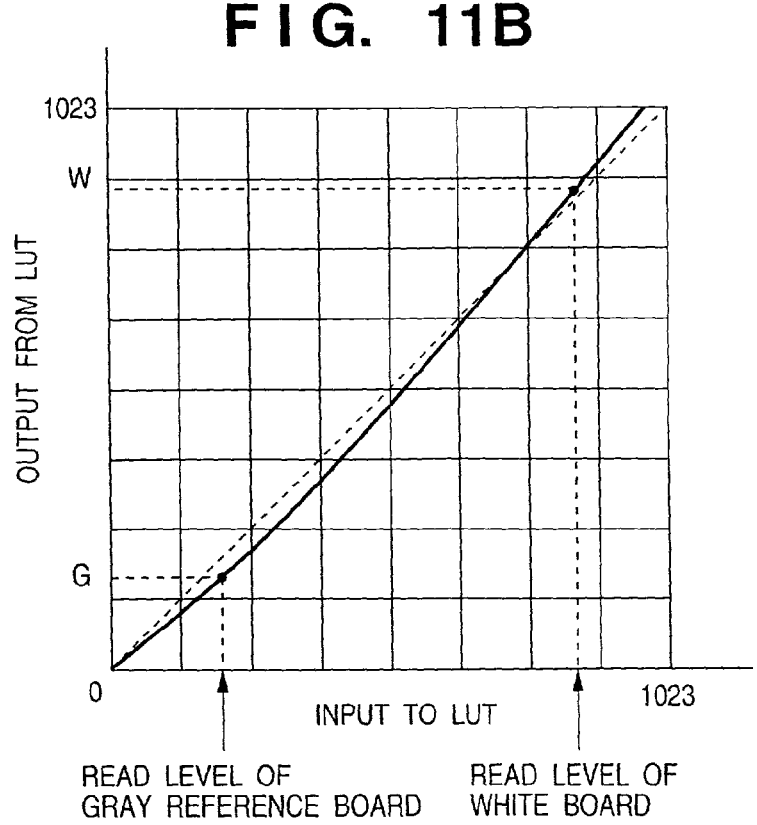

The CPU 20 generates a linearity correction table as shown in FIG. 11A or 11B for each channel from the averages of signal levels, obtained by reading the white board 210 and the gray reference board 701, of the pixels in the vicinity of the connection portion (step S303), then sets it to corresponding one of the LUTs 13 to 16 (step S304).

FIGS. 11A and 11B illustrate graphs showing examples of linearity characteristics set in a LUT when the image data is 10-bit image data. In the graphs, the abscissas represent a signal level input to the LUT, and the ordinates represent a signal level output from the LUT. Both of FIGS. 11A and 11B show contents of a LUT having characteristics for converting the average of signal levels obtained by reading the gray reference board 701 to a reference level G which is an expected value to be obtained by reading the gray reference board (referred to as "gray reference level", hereinafter), and converting the average of signal levels obtained by reading the white board 210 to a reference level W which is an expected value to be obtained by reading the white board (referred to as "white reference level", hereinafter).

By calculating the linearity characteristics as shown in FIG. 11A or 11B for each channel and setting it to the corresponding one of the LUTs 13 to 16, it is possible to correct the linearity of all the channel to a common linearity.

More specifically, FIG. 11A shows a case of interpolating the contents of the conversion table between the read levels of the gray reference board 701 and of the white board 210 with two straight lines, and FIG. 11B shows a case of interpolating the contents with a curve. When interpolating with a curve, various arithmetic functions, such as an exponential function and an n-th degree function, may be used for interpolation by fitting.

Now, the white reference level W and the gray reference level G will be explained. Two methods of setting the white reference level W and the gray reference level G are explained.

In the first method, the white reference level W and the gray reference level G are predetermined. For example, the white reference level is set to an ideal level, in advance, which is an expected level to be ideally obtained by reading the white board 210. This value corresponds to the design of the image reading apparatus. The gray reference level G is set in the similar manner. In this case, the white reference level W and the gray reference revel G are predetermined constants.

In contrast, in the second method, the white reference level W and the gray reference level G are calculated from read levels of the respective channels. For example, if the read level of the white board 210 and the gray reference board 701 are,

| Channels | Read Level of White Board | Read Level of Gray reference board |
|---|---|---|
| ODD-1 | W1 | G1 |
| ODD-2 | W2 | G2 |
| EVEN-1 | W3 | G3 |
| EVEN-2 | W4 | G4 | then, the white reference level W is obtained in any of the methods (1) to (3), and the gray reference level G is obtained in any of the methods (4) to (6).

(1) W Average of W1 to W4
(2) W=Maximum Value of W1 to W4
(3) W=Minimum Value of W1 to W4
(4) G=Average of G1 to G4
(5) G=Maximum Value of G1 to G4
(6) G=Minimum Value of G1 to G4

Other calculation methods may be used, of course.

These methods give an allowance to the reference linearity characteristics for matching linearity of the respective channels at the connection portion. Since the differences in linearity of the respective channels are very small as shown in FIG. 10A, variation in reference linearity characteristics within the range as described above rarely affects the image quality.

Figure 12:
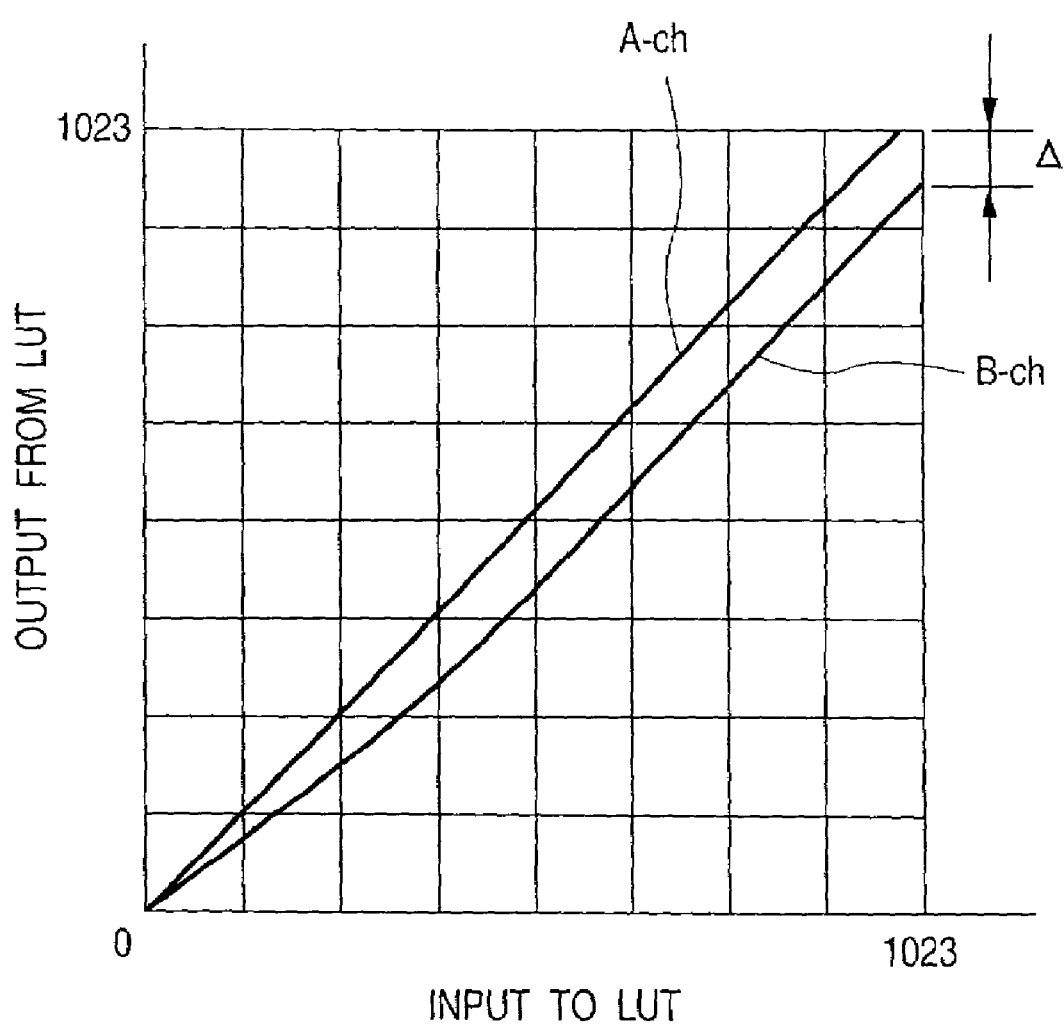
FIG. 12 is a graph for explaining a problem according to the third embodiment of the present invention.

In this case, however, if the LUTs 13 to 16 are set so that the maximum level (saturation level) of the signal after the LUT conversion is smaller than the maximum level (saturation level) before the LUT conversion, there is a possibility that white levels output from the LUTs differ between the channels as shown by "Δ" in FIG. 12.

More specifically, in a case of FIG. 12, the maximum LUT output of A channel which is one of the ODD-1, ODD-2, EVEN-1 and EVEN-2 is "1023", however, the maximum LUT output of B channel, different from the A channel, is smaller than "1023". When a white paper which may cause saturation of pixels is scanned, the obtained white levels may differ from each other.

Therefore, for the LUT conversion, it is necessary to set the contents of the LUTs 13 to 16 so that the maximum level (saturation level) of a signal after the LUT conversion is not smaller than the maximum level (saturation level) of a signal before the LUT conversion.

In order to set the LUTs 13 to 16 as described above, following countermeasures may be taken.

(1) Limit the combination of methods for calculating the white reference level W and the gray reference level G as follows.

W=Maximum value of W1 to W4
G=Minimum value of G1 to G4

The middle values are obtained by linear interpolation.

With this combination, since the slope of the straight line between W and G is always greater than 1, the maximum level (saturation level) of a signal after the LUT conversion never be smaller than the maximum level (saturation level) of the signal before the LUT conversion.

Figure 13:
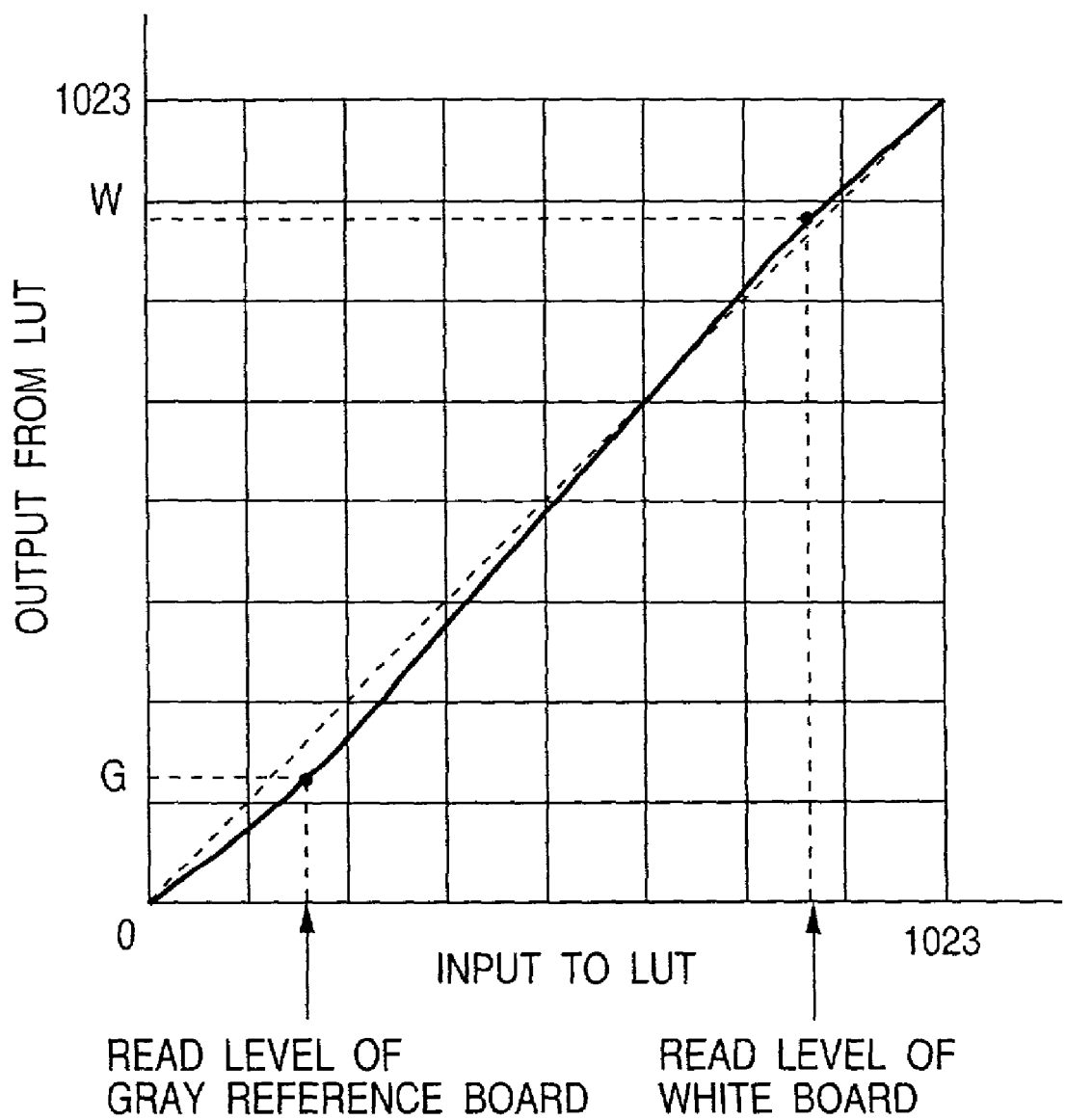
FIG. 13 is a graph for explaining a method of solving the problem shown in FIG. 12.

(2) Set the LUT tables so that the maximum input level to the LUT always matches the maximum level of the output maximum level, as shown in FIG. 13.

According to the third embodiment as described above, it is possible to reduce a discrepancy between signals, which is a defect of an R/L type linear sensor.

Fourth Embodiment

The fourth embodiment of the present invention will now be explained.

In the aforesaid third embodiment, upon calculating the LUT contents to be used in the linearity correction, the gray reference board 701 is needed in addition to the white board 210 for shading correction, which increases the cost and size of the image reading apparatus.

Figure 14:
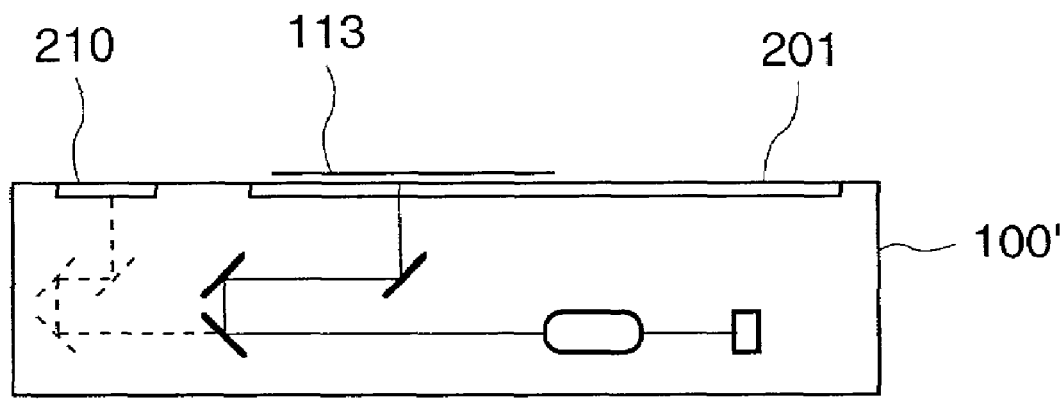
FIG. 14 is a diagram illustrating a configuration of an image reading apparatus according to a fourth embodiment of the present invention.

In order to avoid these problems, the image reading apparatus 100' according to the fourth embodiment does not have the gray reference board 701, as shown in FIG. 14. Instead, a reference chart 113 having a uniform density is placed on the platen glass, and the LUT contents are calculated using the chart. In this case, the image reading apparatus 100' calculates the LUT contents by reading the reference chart 113 and the white board 210 in response to an instruction by an instruction unit (not shown).

Figure 23:
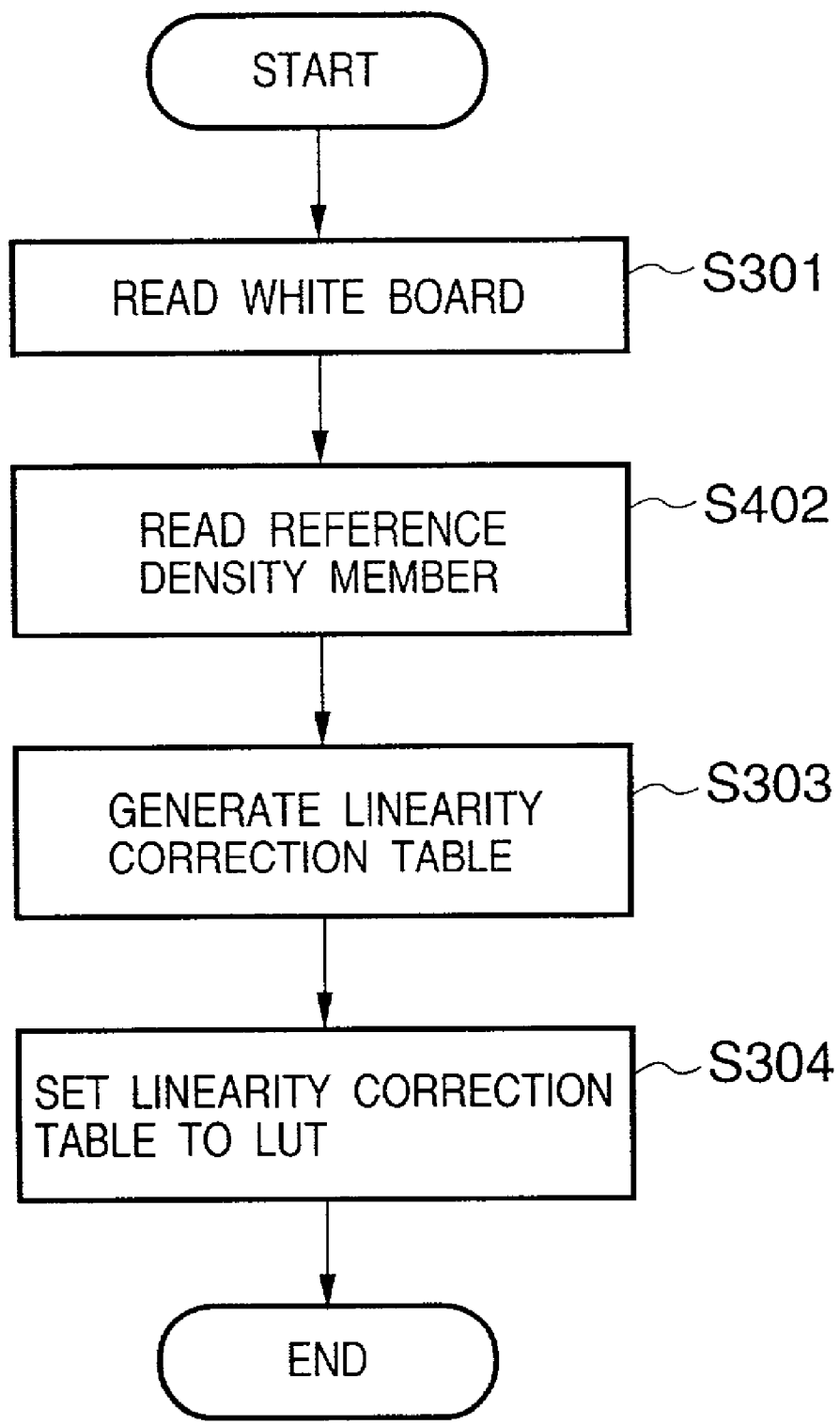
FIG. 23 is a flowchart showing a processing sequence of a linearity correction method according to the fourth embodiment.

The processing sequence according to the fourth embodiment is as shown in FIG. 23. In the fourth embodiment, instead of scanning the gray reference board 701 provided within the image reading apparatus at step S302 in FIG. 22 described in the third embodiment, the reference chart 113 placed on the platen glass is scanned at step S402 in FIG. 23. Other processes are same as those shown in FIG. 22, and the explanation of them is omitted.

Figure 15A:
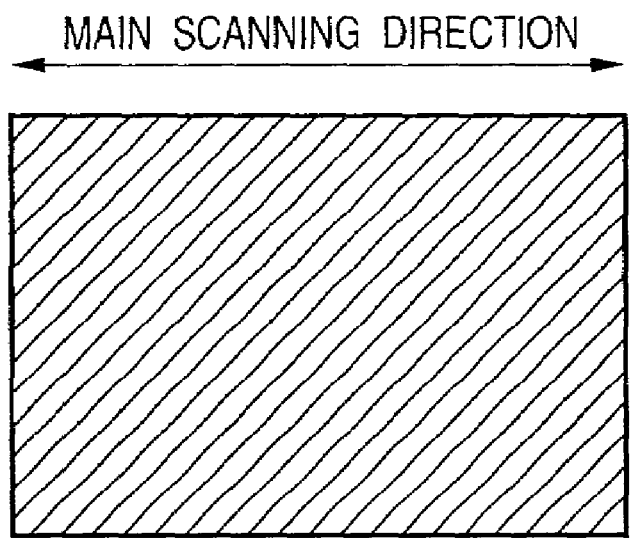
FIGS. 15A and 15B show examples of reference charts according to the fourth embodiment of the present invention.
Figure 15B:
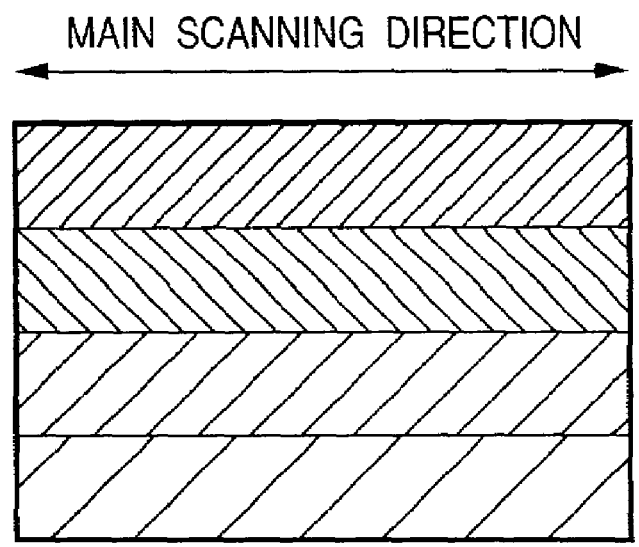
Figure 16:
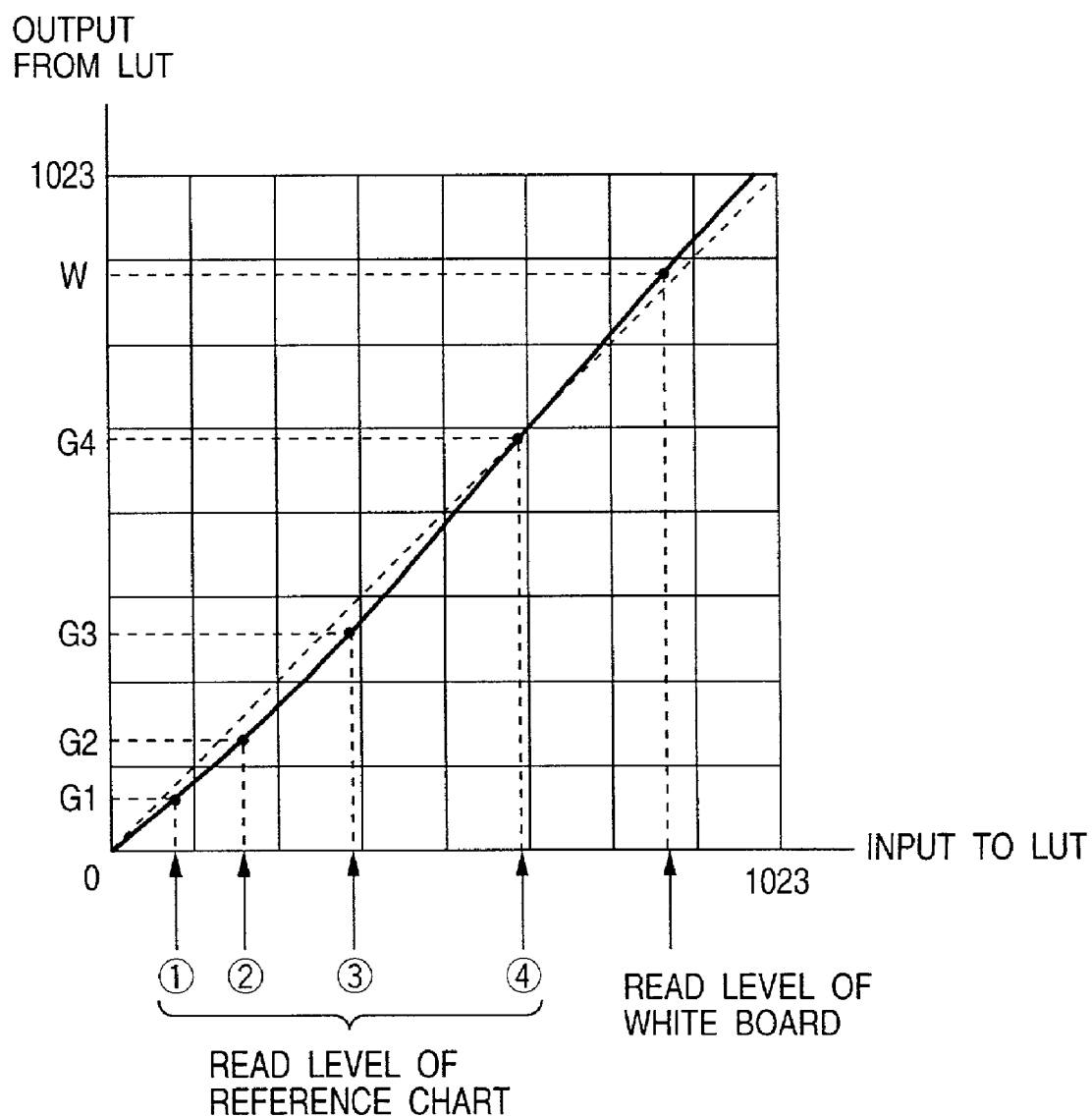
FIG. 16 is a graph showing an example of contents set in LUT according to the fourth embodiment of the present invention.

As the reference chart 113 to be used, a uniform density pattern as shown in FIG. 15A and a step pattern (made of plurality of uniform density colors) as shown in FIG. 15B may be considered. Especially in the pattern shown in FIG. 15B, since it is possible to scan different tones, more reference points which may be used for calculation of LUT contents can be obtained. Accordingly, LUT contents of improved precision for correction can be calculated. It should be noted that the white reference level W and gray reference levels corresponding to the respective tones on the reference chart 113 (here, G1 to G4) may be set in the same manner as described in the third embodiment.

As the reference chart 113, the one which is generated by a personal computer and printed by a printer, for instance, may be used. However, it is necessary to optically blur the black dots printed by the printer to make the density uniform. Therefore, any supporting member for supporting the chart slightly above the platen glass may be used so as not to directly place the printed reference chart on the platen glass. Another glass may be placed on the platen glass instead of using the supporting member.

Figure 17:
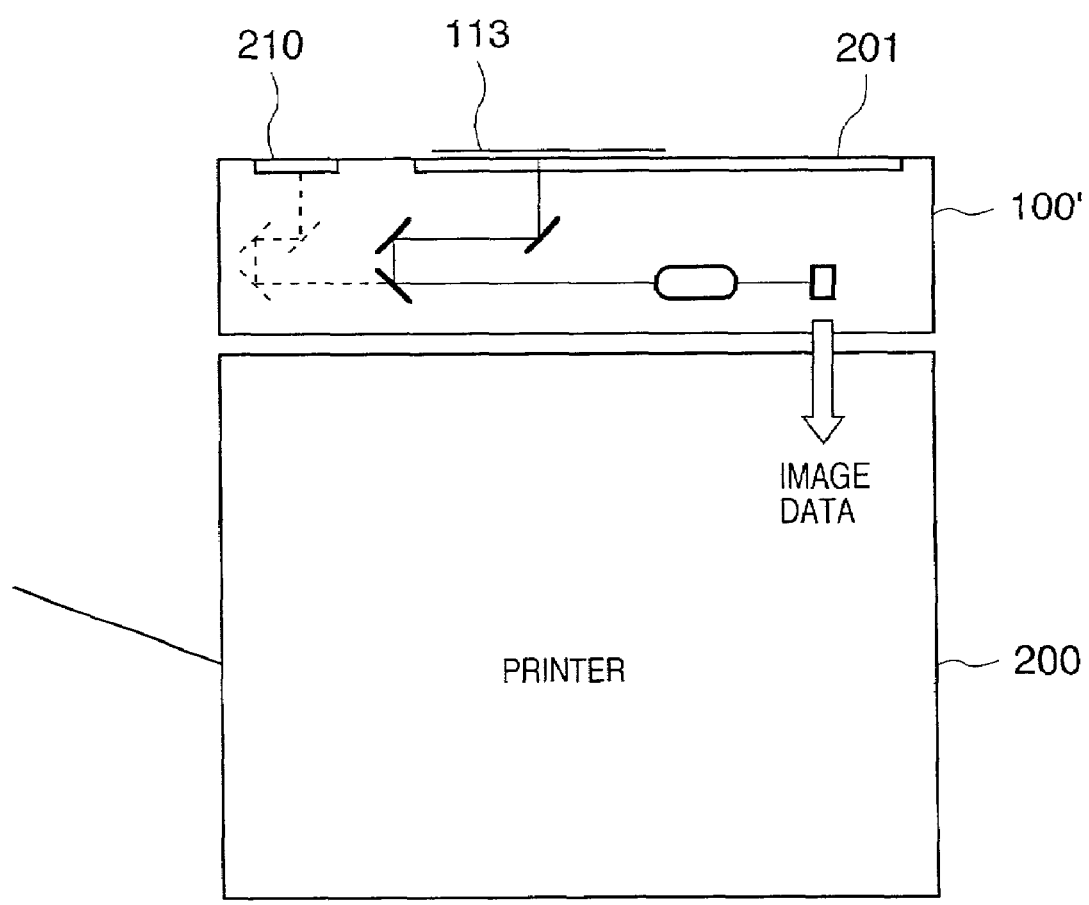
FIG. 17 shows a schematic configuration of a system when the image reading apparatus of the fourth embodiment is connected to a printer.

Further, when the image reading apparatus 100' of the fourth embodiment is combined with a printer 200 and used as a copying machine as shown in FIG. 17, a test print or a copy print printed by the printer 200 may be used. In this case, the charts as shown in FIGS. 15A and 15B may be used as the reference chart 113. Further, in order to make the printed black dots optically blurred for making the density uniform, a supporting member would better be used for supporting the chart slightly above the platen glass so as not to directly place the chart on the platen glass, as described above.

Fifth Embodiment

The fifth embodiment of the present invention will be now explained. In the fifth embodiment, a color linear image sensor is used.

Figure 18:
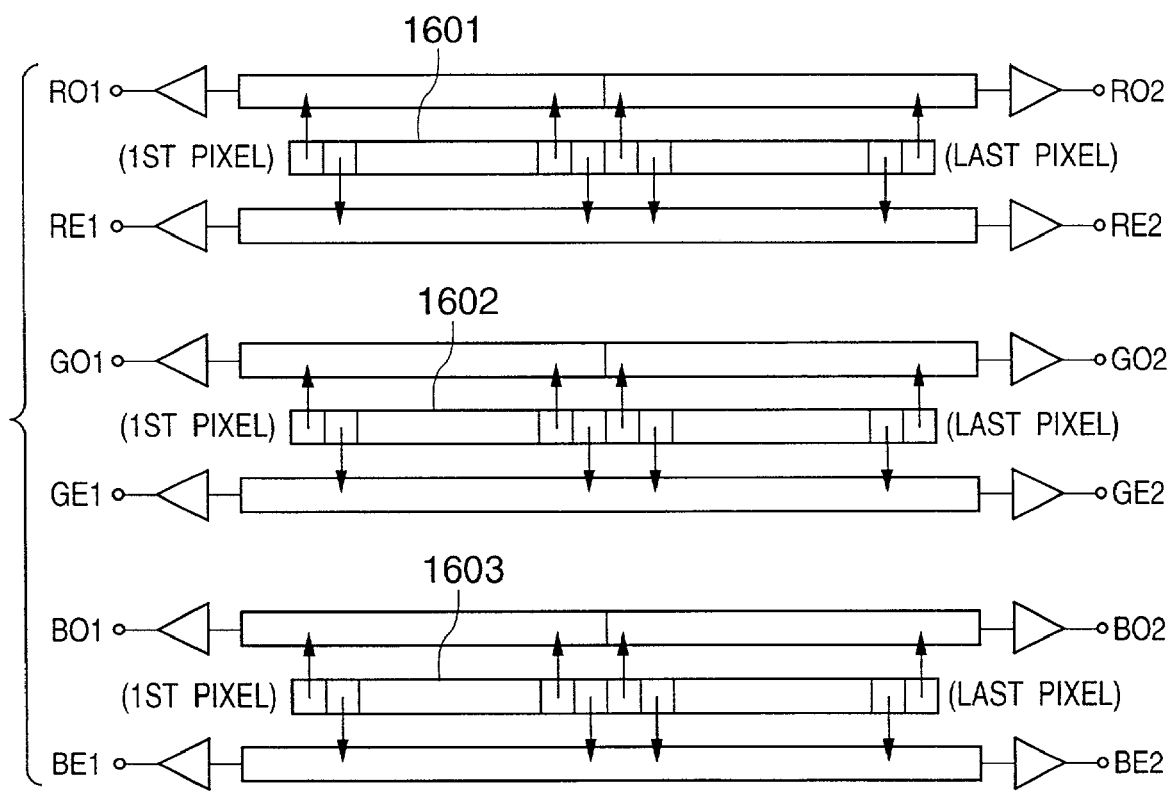
FIG. 18 shows a configuration of a color linear CCD image sensor according to a fifth embodiment of the present invention.

FIG. 18 shows an example of a configuration of a color linear image sensor according to the fifth embodiment. In FIG. 18, reference numeral 1601 denotes a photoreceptive unit for red (R), 1602, a photoreceptive unit for green (G), and 1603, a photoreceptive unit for blue (B). Signals from each photoreceptive unit are separately read for even- and odd-number pixels in the right-side area, and for and even- and odd-number pixels in the left-side area, similarly to the configuration shown in FIG. 26.

For each of the photoreceptive units 1601 to 1603 of the color linear image sensor having the aforesaid configuration, a unit shown in FIG. 1 for adjusting discrepancy in signal levels of pixels between the right- and left-side areas is provided. The unit works in a similar manner as described in one of the first to fourth embodiments.

Further, the input signal ODD-1 in FIG. 1 represents one of RO1, GO1 and BO1 output from the R, G and B photoreceptive units 1601 to 1603, EVEN-1 represents corresponding one of RE1, GE1 and BE1, ODD-2 represents corresponding one of RO1, RO2, GO2 and BO2, and EVEN-2 represents corresponding one of RE1, RE2, GE2 and BE2.

According to the fifth embodiment as described above, when an R/L type color linear sensor used, it is possible to reduce a discrepancy in level of signals obtained from right- and left-side areas of the color linear sensor.

Sixth Embodiment

In the aforesaid first to fifth embodiments, a R/L type linear sensor is explained. In the sixth embodiment, a case of applying the present invention to an area image sensor is described.

Figure 19:
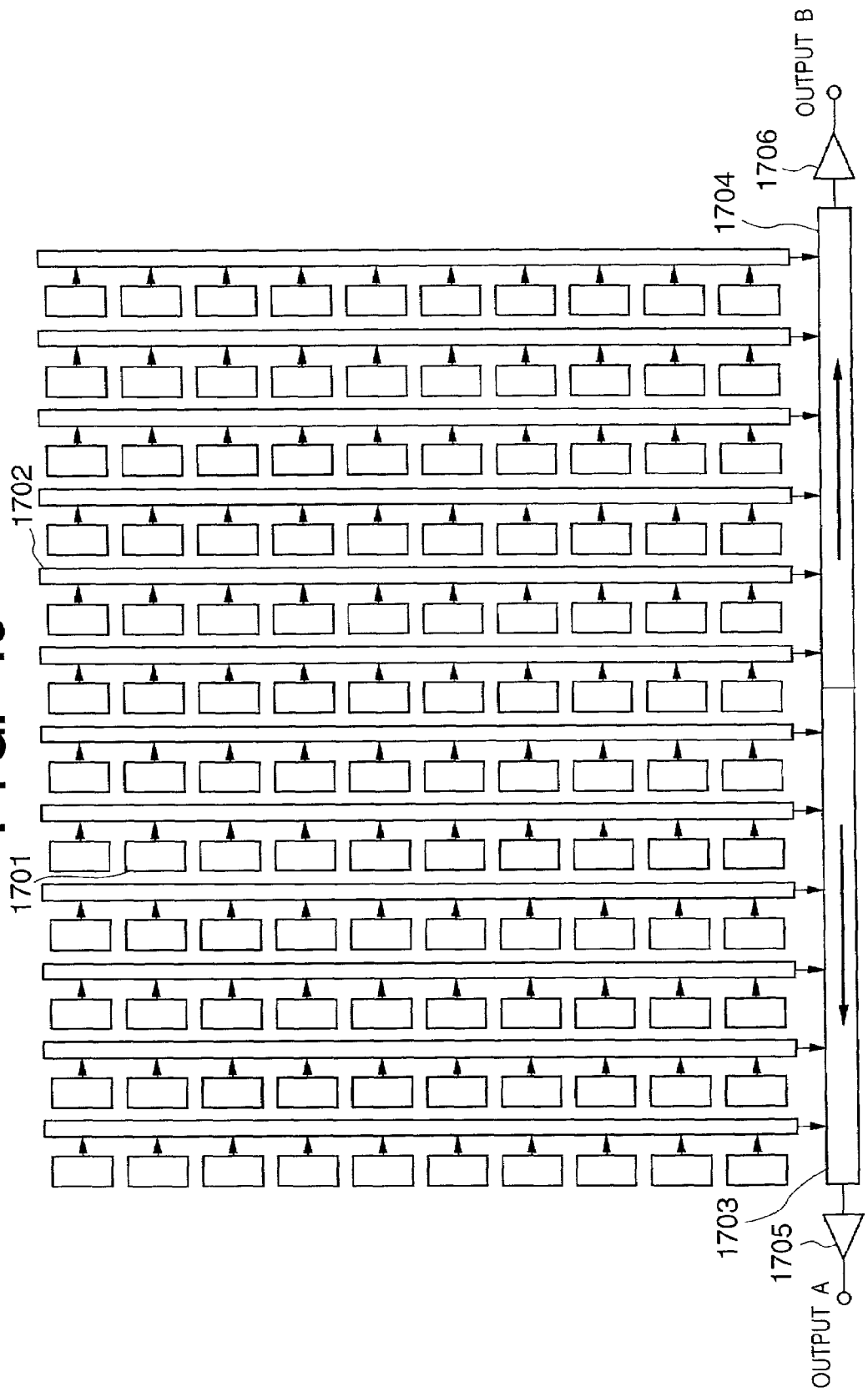
FIG. 19 shows a configuration of an area CCD image sensor according to a sixth embodiment of the present invention.

FIG. 19 shows an configuration of an interline type area image sensor according to the sixth embodiment of the present invention.

Referring to FIG. 19, reference numeral 1701 denotes each of photoreceptive pixels; 1702, a vertical transfer CCD; 1703 and 1704, horizontal transfer CCD which transfers changes to the left and right, respectively, with respect to the center; and 1705 and 1706, output amplifiers. In this area image sensor, signals from the photoreceptive pixels 1701 included in the left-side area of the area image sensor are transferred by the horizontal transfer CCD 1703 and outputted via the output amplifier 1705. Further, signals from the photoreceptive pixels 1702 included in the right-side area are transferred by the horizontal transfer CCD 1704 and outputted via the output amplifier 1706. An area image sensor of this type can be easily manufactured. It should be noted that a frame transfer type (progressive scanning type) area sensor may be used instead of the interline type area sensor.

Furthermore, it is technically possible to manufacture such a configuration as to separately output charges accumulated in pixels in the right- or left-side areas or plural divided areas in, e.g., a MOS type image sensor in which XY addresses of the photoreceptive pixels are designated to read out a charge. This configuration is advantageous when transferring charges of predetermined number of pixels in a limited time period.

Figure 20:
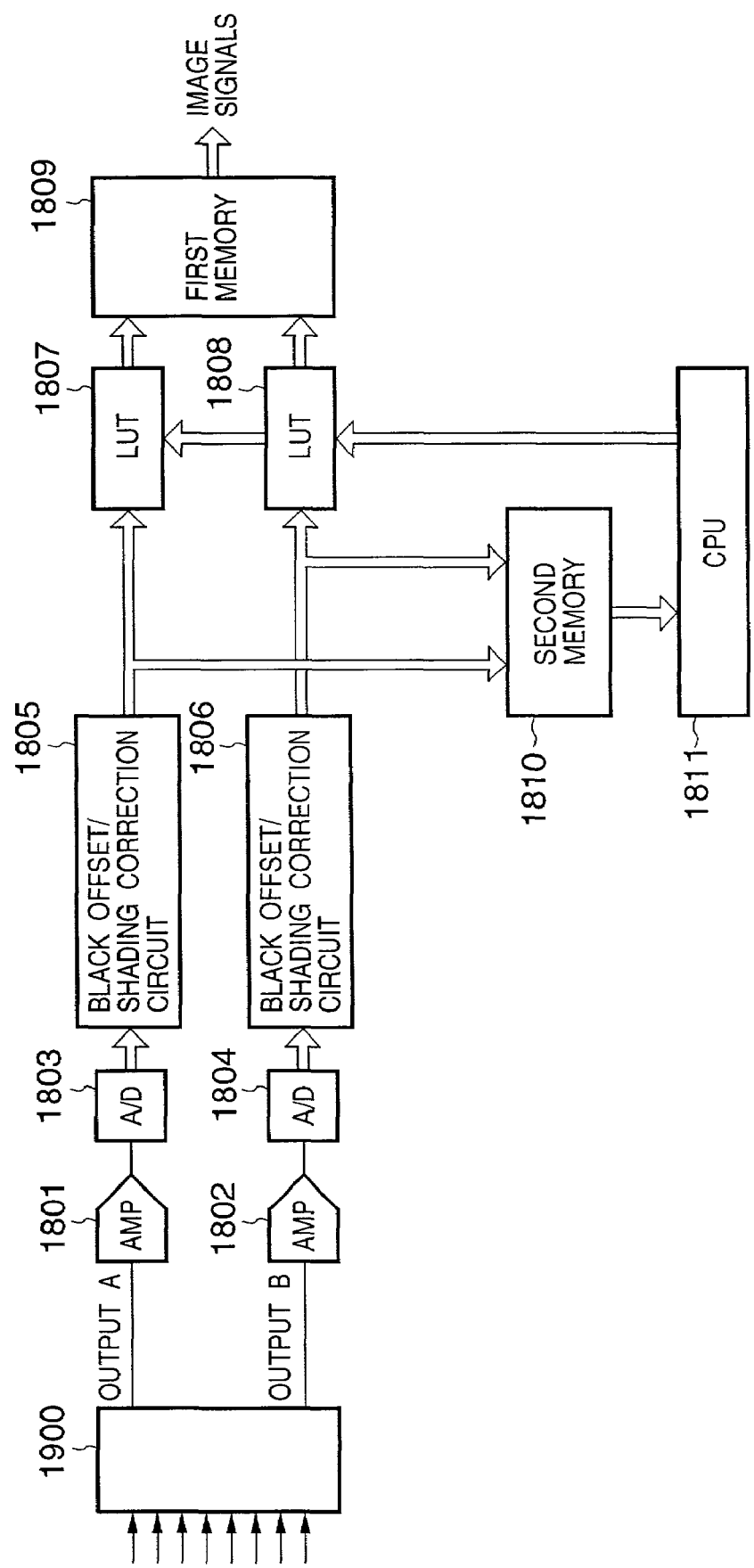
FIG. 20 is a block diagram illustrating a partial configuration of an image reading apparatus according to the sixth embodiment of the present invention.

FIG. 20 shows a configuration of a processing system for the R/L type area image sensor shown in FIG. 19.

Referring to FIG. 20, reference numeral 1801 and 1802 denote amplifiers for signals of right- and left-side areas separately output from the respective channels read out (Outputs A and B from the amplifiers 1705 and 1706 in FIG. 19. Referred to as "A and B channels", respectively, hereinafter); 1803 and 1804, A/D converters; 1805 and 1806, black offset/shading correction circuits; and 1807 and 1808, LUTs (look up tables) for realizing discrepancy correction between signals output from the A and B channels. Further, reference numeral 1809 denotes a first memory for changing the order of the separately read image signals via the A and B channels to the order of pixels for combining the image signals. Reference numeral 1810 denotes a second memory. The CPU 1811 can set a conversion table to the LUTs 1807 and 1808 calculated by referring to the second memory 1802.

When an area sensor is used, it is possible to perform discrepancy correction and/or linearity correction similarly to that for a linear image sensor by reading a gray reference board or a reference density member having a predetermined density in the same sequence as described in the first to fourth embodiment. For instance, it is possible to correct linearity of the A and B channels in an adjustment stage after assembling an apparatus in a manufactory.

Further, if an iris diaphragm is provided in front of the area image sensor, by changing aperture of the iris diaphragm, if an illumination device is provided, by changing the quantity of illumination light, and if the area sensor has an electronic shutter function, by changing exposure time using the electronic shutter, it is possible to obtain different signal levels. In these cases, the white board and gray reference board are not needed.

According to the sixth embodiment as described above, it is possible to reduce the discrepancy between signals output from right- and left-side areas in a R/L type area image sensor.

It should be noted that the R/L type image sensors are explained in the first to sixth embodiments, however, it will be appreciated that the method of dividing the photoreceptive pixels are not limited to this.

Other Embodiment

The present invention can be applied to a system constituted by a plurality of devices (e.g., host computer, interface, reader, printer) or to an apparatus comprising a single device (e.g., scanner, CCD camera, copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments are realized by executing the program codes which are read by a computer, the present invention includes a case where an OS (operating system) or the like working on the computer performs a part or the entire processes in accordance with designations of the program codes and realize functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

Figure 21:
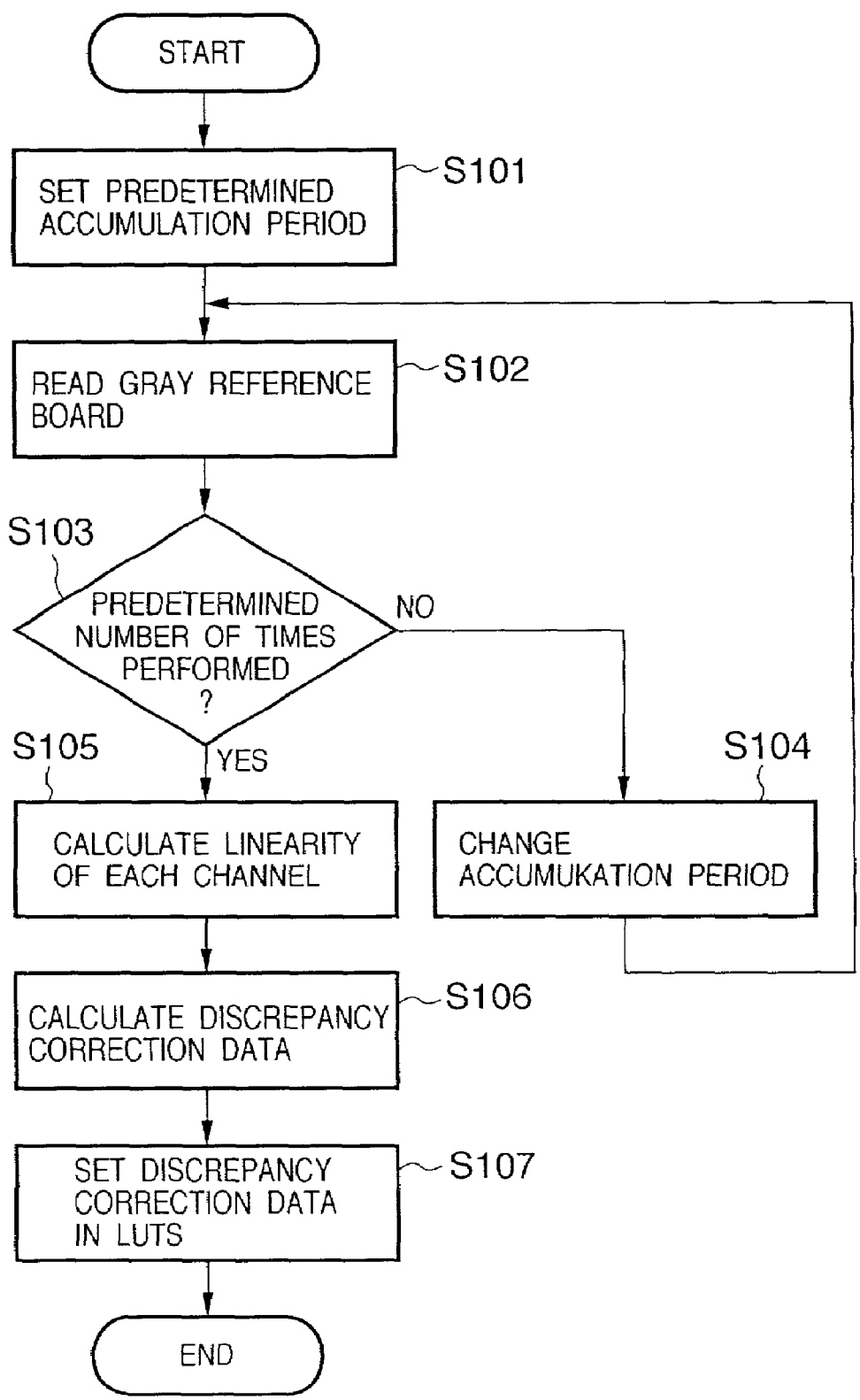
FIG. 21 is a flowchart showing a processing sequence of a discrepancy correction method according to the first embodiment.

In a case where the present invention is applied to the aforesaid storage medium, the storage medium stores program codes corresponding to any of the flowcharts shown in FIGS. 21 to 23 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:
    an image sensor which separately reads out image signals from a plurality of photoreceptive pixels via a plurality of output channels;
    a reference level acquisition unit adapted to acquire a first reference level by selecting a maximum of the image signals read via said plurality of output channels when said image sensor reads a white member, and acquire a second reference level by selecting a minimum of the image signals via said plurality of output channels when said image sensor reads a reference density member having a predetermined density of half tone;
    a reference value setting means for setting reference values by fitting said first and second reference levels; and
    a plurality of adjustment units, respectively corresponding to said plurality of output channels, each adapted to adjust levels of the image signals output via corresponding one of said plurality of output channels to said corresponding reference values set by said reference value setting means.

2. The image sensing apparatus according to claim 1, wherein said reference density member is provided within the image sensing apparatus.

3. The image sensing apparatus according to claim 1 further comprising a platen for placing an original to be read on it,
    wherein said image sensor reads said reference density member in a case where said reference density member is placed on said platen.

4. The image sensing apparatus according to claim 1, wherein said first and second reference levels are fit to by a straight line.

5. The image sensing apparatus according to claim 1, wherein said first and second reference levels are fit to a curve.

6. The image sensing apparatus according to claim 1, wherein the interpolation is performed by operation.

7. The image sensing apparatus according to claim 1, wherein each of said plurality of adjustment units includes a look up table for converting levels of the image signals output via corresponding one of said plurality of output channels to said reference values.

8. The image sensing apparatus according to claim 1, wherein said plurality of output channels comprise a first output channel which outputs image signals of even-numbered photoreceptive pixels, and a second output channel which outputs image signals of even-numbered photoreceptive pixels.

9. The image sensing apparatus according to claim 1, wherein said image sensor is a linear image sensor.

10. The image sensing apparatus according to claim 9, wherein a plurality of said linear image sensors respectively corresponding to a plurality of colors are provided to form a color image sensor.

11. The image sensing apparatus according to claim 1, wherein said image sensor is an area image sensor.

12. The image sensing apparatus according to claim 1, wherein each of said plurality of adjustment units includes an amplifier for amplifying the image signal output via corresponding one of said plurality of output channels to said reference values.

13. The image sensing apparatus according to claim 1, further comprising A/D converters each adapted to convert the image signal output from each output channel from an analog signal to a digital signal.

14. The image sensing apparatus according to claim 3, wherein the image sensing apparatus is connected to a printer and said reference density member is printed by said printer.

15. The image sensing apparatus according to claim 14, wherein the image sensing apparatus is integrally configured with said printer.

16. The image sensing apparatus according to claim 1, wherein said reference density member has at least a portion of uniform density.

* * * * *

UNITED STATES PATENT AND TRADEMARK OFFICE
CERTIFICATE OF CORRECTION

PATENT NO. : 7,324,236 B2
APPLICATION NO. : 09/772664
DATED : January 29, 2008
INVENTOR(S) : Ohashi It is certified that error appears in the above-identified patent and that said Letters Patent is hereby corrected as shown below:

On the Title Page, under "(56) References Cited", Sub-heading "U.S. PATENT DOCUMENTS", delete following document citations:

"5,284,746 A 2/1994 Sledziewski et al. .......... 435/6;

5,366,889 A 11/1994 McDonald et a;. ........... 435/252.3;

5,468,854 A 11/1995 McCabe et al. ................. 540/498;

5,482,835 A 1/1996 King et al. ......................... 435/6;

5,491,084 A 2/1996 Chalfie et al. ....................... 435/189;

5,532,157 A 7/1996 Fink ...................................... 435/240.26;

5,576,436 A 11/1996 McCabe et al. ................... 546/156; and 5,989,835 A 11/1999 Dunlayet et al. ...................... 506/10".

Signed and Sealed this

Twenty-second Day of July, 2008

JON W. DUDAS
*Director of the United States Patent and Trademark Office*